US010846048B2

(12) United States Patent
Lay et al.

(10) Patent No.: US 10,846,048 B2
(45) Date of Patent: Nov. 24, 2020

(54) WIRELESS COORDINATION OF AUDIO PLAYBACK

(71) Applicant: EVA Automation, Inc., Menlo Park, CA (US)

(72) Inventors: Leo Lay, Oakland, CA (US); Adrian Harold Chadd, Santa Clara, CA (US); Haisong Wang, Fremont, CA (US); Shiwei Zhao, Union City, CA (US); Li Li, San Jose, CA (US); Gaylord Yu, San Francisco, CA (US)

(73) Assignee: EVA Automation, Inc., Menlo Park, CA (US)

( * ) Notice: Subject to any disclaimer, the term of this patent is extended or adjusted under 35 U.S.C. 154(b) by 0 days.

(21) Appl. No.: 16/266,101

(22) Filed: Feb. 3, 2019

(65) Prior Publication Data

US 2019/0171412 A1   Jun. 6, 2019

Related U.S. Application Data

(63) Continuation of application No. 15/678,069, filed on Aug. 15, 2017, now Pat. No. 10,255,033.
(Continued)

(51) Int. Cl.
*G06F 3/16* (2006.01)
*H04R 27/00* (2006.01)
(Continued)

(52) U.S. Cl.
CPC ............ *G06F 3/165* (2013.01); *H04H 60/80* (2013.01); *H04J 3/0632* (2013.01);
(Continued)

(58) Field of Classification Search
CPC ...... H04R 27/00; H04R 2420/07; H04R 3/12; H04M 1/72558; H04L 65/60;
(Continued)

(56) References Cited

U.S. PATENT DOCUMENTS

| 7,539,551 | B2 * | 5/2009 | Komura | H04S 1/00 455/3.06 |
| 7,539,889 | B2 * | 5/2009 | Celinski | G06F 1/12 713/400 |

(Continued)

OTHER PUBLICATIONS

Examination Report, European Patent Application No. 17880403.5, dated Sep. 2, 2019.
(Continued)

*Primary Examiner* — Jesse A Elbin
(74) *Attorney, Agent, or Firm* — Steven Stupp

(57) ABSTRACT

An electronic device that coordinates a playback operation is described. In particular, an interface circuit in the electronic device may calculate, based on differences between transmit times when packets were transmitted by a second electronic device and receive times of the packets, relative drift as a function of time between a clock in the interface circuit and a second clock in the second electronic device. Then, the interface circuit may adjust, based on the relative drift, a clock circuit that provides the clock to eliminate the relative drift, and may determine a remaining time offset between the clock and the second clock. Next, the interface circuit may modify a future time when the electronic device is to perform the playback operation based on the remaining time offset to determine a corrected future time, and the electronic device may perform the playback operation at the corrected future time.

20 Claims, 18 Drawing Sheets

Related U.S. Application Data

(60) Provisional application No. 62/433,238, filed on Dec. 13, 2016.

(51) Int. Cl.

| | |
|---|---|
| *H04L 7/00* | (2006.01) |
| *H04L 7/033* | (2006.01) |
| *H04R 3/12* | (2006.01) |
| *H04L 29/06* | (2006.01) |
| *H04N 21/43* | (2011.01) |
| *H04J 3/06* | (2006.01) |
| *H04N 21/233* | (2011.01) |
| *H04H 60/80* | (2008.01) |
| *H04M 1/725* | (2006.01) |
| *H04N 21/81* | (2011.01) |

(52) U.S. Cl.
CPC .......... *H04J 3/0661* (2013.01); *H04L 7/0012* (2013.01); *H04L 7/0016* (2013.01); *H04L 7/033* (2013.01); *H04L 7/0331* (2013.01); *H04L 65/4069* (2013.01); *H04L 65/60* (2013.01); *H04L 65/608* (2013.01); *H04L 65/80* (2013.01); *H04M 1/72558* (2013.01); *H04N 21/233* (2013.01); *H04N 21/4305* (2013.01); *H04N 21/8113* (2013.01); *H04R 3/12* (2013.01); *H04R 27/00* (2013.01); *H04R 2227/005* (2013.01); *H04R 2420/07* (2013.01)

(58) Field of Classification Search
CPC ..... H04L 65/601; H04L 65/607; H04L 7/033; H04L 7/0012; H04L 7/0037; H04L 7/04; H04H 60/80; H04H 60/88; G06F 3/165
USPC .......................................................... 700/94
See application file for complete search history.

(56) References Cited

U.S. PATENT DOCUMENTS

| | | | |
|---|---|---|---|
| 8,370,678 B2 * | 2/2013 | Millington | G06F 1/00 |
| | | | 713/500 |
| 8,930,006 B2 * | 1/2015 | Haatainen | H04J 3/0667 |
| | | | 700/94 |
| 9,307,508 B2 * | 4/2016 | Daley | H04H 20/08 |
| 9,407,388 B2 * | 8/2016 | Grenabo | H04J 3/0667 |
| 9,426,598 B2 * | 8/2016 | Walsh | H04S 7/301 |
| 2007/0110074 A1 | 5/2007 | Bradley | 370/395.51 |
| 2007/0226530 A1 | 9/2007 | Celinski | 713/500 |
| 2015/0142929 A1 | 5/2015 | White | H04L 67/10 |
| 2015/0249967 A1 | 9/2015 | Kafle | H04W 56/004 |
| 2016/0142988 A1 * | 5/2016 | Powell | H04W 56/00 |
| | | | 370/338 |
| 2017/0069338 A1 | 3/2017 | Elliot | G10L 21/04 |

OTHER PUBLICATIONS

Examination Report, European Patent Application No. 17880790.5, dated Nov. 18, 2019.

\* cited by examiner

WIRELESS COORDINATION OF AUDIO PLAYBACK

CROSS REFERENCE TO RELATED APPLICATIONS

This application is a continuation of U.S. Non-Provisional application Ser. No. 15/678,069, "Wireless Coordination of Audio Playback," by Leo Lay, Adrian Harold Chadd, Haisong Wang, Shiwei Zhao, Li Li and Gaylord Yu, filed on Aug. 15, 2017, which claims priority under 35 U.S.C. 119(e) to U.S. Provisional Application Ser. No. 62/433,238, "Wireless Coordination of Audio Playback," by Gaylord Yu, filed on Dec. 13, 2016, the contents of which are herein incorporated by reference.

This application is related to: U.S. Non-Provisional application Ser. No. 16/266,099, "Wireless Coordination of Audio Sources," by Gaylord Yu and Steven Stupp, filed on Feb. 3, 2019; U.S. Non-Provisional application Ser. No. 16/266,100, "Schedule-Based Coordination of Audio Sources," by Gaylord Yu and Steven Stupp, filed on Feb. 3, 2019; U.S. Non-Provisional application Ser. No. 15/678,043, "Wireless Coordination of Audio Sources," by Gaylord Yu and Steven Stupp, filed on Aug. 15, 2017; U.S. Non-Provisional application Ser. No. 15/678,048, "Schedule-Based Coordination of Audio Sources," by Gaylord Yu and Steven Stupp, filed on Aug. 15, 2017; U.S. Non-Provisional application Ser. No. 15/678,072, "Source Coordination of Audio Playback," by Leo Lay, Adrian Harold Chadd, Haisong Wang, Shiwei Zhao, Li Li and Gaylord Yu, filed on Aug. 15, 2017; U.S. Non-Provisional application Ser. No. 15/678,078, "Maintaining Coordination Following a Wireless Reset," by Leo Lay, Adrian Harold Chadd, Haisong Wang, Shiwei Zhao, Li Li and Gaylord Yu, filed on Aug. 15, 2017; U.S. Non-Provisional application Ser. No. 15/678,083, "Software-Assisted Wireless Coordination of Audio Playback," by Leo Lay, Adrian Harold Chadd, Haisong Wang, Shiwei Zhao, Li Li and Gaylord Yu, filed on Aug. 15, 2017; and U.S. Non-Provisional application Ser. No. 15/678,087, "Software-Based Wireless Coordination of Audio Playback," by Leo Lay, Adrian Harold Chadd, Haisong Wang, Shiwei Zhao, Li Li and Gaylord Yu, filed on Aug. 15, 2017.

BACKGROUND

Field

The described embodiments relate to a coordination technique. More specifically, the described embodiments include a coordination technique that wireless coordinates playback times of electronic devices that output sound.

Related Art

Music often has a significant impact on an individual's emotions and perceptions. This is thought to be a result of connections or relationships between the areas of the brain that decipher, learn, and remember music with those that produce emotional responses, such as the frontal lobes and limbic system. Indeed, emotions are thought to be involved in the process of interpreting music, and concurrently are very important in the effect of music on the brain. Given this ability of music to 'move' a listener, audio quality is often an important factor in user satisfaction when listening to audio content and, more generally, when viewing and listening to audio/video (A/V) content.

However, it is often challenging to achieve high audio quality in an environment. For example, the acoustic sources (such as loudspeakers) may not be properly placed in the environment. Alternatively or additionally, a listener may not be located at an ideal position in the environment. In particular, in a stereo playback system, the so-called 'sweet spot,' where the amplitude differences and arrival time differences are small enough that an apparent image and localization of an original sound source are both maintained, is usually limited to a fairly small area between the loudspeakers. When the listener is outside that area, the apparent image collapses and only one or the other independent audio channel output by the loudspeakers may be heard. Furthermore, achieving high audio quality in the environment typically places strong constraints on synchronization of the loudspeakers.

Consequently, when one or more of these factors is sub-optimal, the acoustic quality in the environment may be degraded. In turn, this may adversely impact listener satisfaction and the overall user experience when listening to audio content and/or A/V content.

SUMMARY

A first group of described embodiments includes an electronic device. This electronic device includes: one or more antennas; an interface circuit; and a clock circuit. During operation, the interface communicates with a second electronic device using wireless communication, and the clock circuit provides a clock in the electronic device. Moreover, the interface circuit may receive, via the wireless communication, packets from the second electronic device, where a given packet includes a transmit time, based on a second clock in the second electronic device, when the second electronic device transmitted the given packet. In response, the interface circuit may store receive times, based on the clock, when the packets were received, and may calculate, based on differences between the transmit times and the receive times, relative drift as a function of time between the clock and the second clock. Then, the interface circuit may adjust, based on the relative drift, the clock circuit that provides the clock to eliminate the relative drift, and may determine a remaining time offset between the clock and the second clock. Furthermore, the interface circuit may receive, via the wireless communication, information from the second electronic device specifying a future time when the electronic device is to perform a playback operation. Next, the interface circuit may modify the future time based on the remaining time offset to determine a corrected future time, and the electronic device may perform the playback operation at the corrected future time.

Note that the transmit time may be included in the given packet in a payload and/or a media access control (MAC) header. In some embodiments, the packets include control packets. Alternatively or additionally, the packets may include data packets.

Moreover, the clock circuit may include: an oscillator that provides a reference clock; and a frequency-locked-loop (FLL) circuit that generates the clock based on the reference clock. The interface circuit may modify the FLL to adjust the clock. For example, modifying the FLL may involve changing a seed of a synthesizer in the FLL.

Furthermore, the transmit time and the receive time may be stored on opposite ends of a payload of the given packet. In these embodiments, the electronic device may determine a duration of the payload (e.g., using software executed by a processor or the interface circuit) and the interface circuit may add the duration to the remaining offset time.

Additionally, the transmit times may include second counter values corresponding to the second clock and the receive times may include counter values corresponding to the clock.

In some embodiments, the packets include audio data in payloads, and the electronic device stores the audio data in a queue. In these embodiments, the playback operation includes outputting the audio data from the queue.

Note that adjusting the clock and the modifying the future time coordinate the playback operation in a clock domain of the clock to within a predefined value of a clock domain of the second clock.

Moreover, the second electronic device may be a master and the electronic device may be a slave.

Furthermore, the receive times are associated with a wireless ranging capability of the interface circuit.

Another embodiment provides a computer-readable storage medium for use with the interface circuit in the electronic device. This computer-readable storage medium includes instructions for at least some of the operations performed by the electronic device.

Another embodiment provides a method for coordinating a playback operation. This method includes at least some of the operations performed by the electronic device.

Another embodiment provides the second electronic device.

A second group of described embodiments includes an electronic device. This electronic device includes: one or more antennas; an interface circuit; and a clock circuit. During operation, the interface communicates with a second electronic device using wireless communication, and the clock circuit provides a clock in the electronic device. Moreover, the interface circuit may receive, via the wireless communication, packets from the second electronic device, where a given packet includes a transmit time, based on a second clock in the second electronic device, when the second electronic device transmitted the given packet. In response, the interface circuit may store receive times, based on the clock, when the packets were received, and may calculate, based on differences between the transmit times and the receive times, relative drift as a function of time between the clock and the second clock. Then, the interface circuit may adjust, based on the relative drift, the clock circuit that provides the clock to eliminate the relative drift, and may determine a remaining time offset between the clock and the second clock. Furthermore, the interface circuit may modify, based on the remaining time offset, a future time when the second electronic device is to perform a playback operation to determine a corrected future time. Next, the interface circuit may transmit, via the wireless communication, information to the second electronic device specifying the corrected future time.

Note that the transmit time may be included in the given packet in a payload and/or a media access control (MAC) header. In some embodiments, the packets include control packets. Alternatively or additionally, the packets may include data packets.

Moreover, the clock circuit may include: an oscillator that provides a reference clock; and a frequency-locked-loop (FLL) circuit that generates the clock based on the reference clock. The interface circuit may modify the FLL to adjust the clock. For example, modifying the FLL may involve changing a seed of a synthesizer in the FLL (such as an accumulator in the synthesizer).

Furthermore, the transmit time and the receive time may be stored on opposite ends of a payload of the given packet. In these embodiments, the electronic device may determine a duration of the payload (e.g., using software executed by a processor or the interface circuit) and the interface circuit may add the duration to the remaining offset time.

Additionally, the transmit times may include second counter values corresponding to the second clock and the receive times may include counter values corresponding to the clock.

In some embodiments, prior to transmitting the information, the interface circuit transmits additional packets that include audio data in payloads, and the playback operation includes outputting the audio data. However, in some embodiments at least some of the audio data is included in the same packet(s) as the information.

Note that adjusting the clock and the modifying the future time coordinate the playback operation in a clock domain of the clock to within a predefined value of a clock domain of the second clock.

Moreover, the electronic device may be a slave and the second electronic device may be a master.

Furthermore, the receive times are associated with a wireless ranging capability of the interface circuit.

Another embodiment provides a computer-readable storage medium for use with the interface circuit in the electronic device. This computer-readable storage medium includes instructions for at least some of the operations performed by the electronic device.

Another embodiment provides a method for coordinating a playback operation. This method includes at least some of the operations performed by the electronic device.

Another embodiment provides the second electronic device.

A third group of described embodiments includes an electronic device. This electronic device includes: one or more antennas; an interface circuit; and a clock circuit. During operation, the interface communicates with a second electronic device using wireless communication, and the clock circuit provides a clock in the electronic device. Moreover, the interface circuit may receive, via the wireless communication, packets from the second electronic device, where a given packet includes a transmit time, based on a second clock in the second electronic device, when the second electronic device transmitted the given packet. In response, the interface circuit may store receive times, based on the clock, when the packets were received, and may calculate, based on differences between the transmit times and the receive times, relative drift as a function of time between the clock and the second clock. Then, the interface circuit may adjust, based on the relative drift, the clock circuit that provides the clock to eliminate the relative drift, and may store the adjustments to the clock circuit. Furthermore, when the interface circuit or a second interface circuit in the second electronic device is reset, the interface circuit may adapt the clock circuit based on the stored adjustments to reduce the relative drift while the interface circuit restores frequency lock with the second clock based on additional packets with additional transmit times that are received from the second electronic device.

Note that the transmit time may be included in the given packet in a payload and/or a media access control (MAC) header. In some embodiments, the packets include control packets. Alternatively or additionally, the packets may include data packets.

Moreover, the clock circuit may include: an oscillator that provides a reference clock; and a frequency-locked-loop (FLL) circuit that generates the clock based on the reference clock. The interface circuit may modify the FLL to adjust the clock. For example, adjustments may be applied to a seed of a first synthesizer in the FLL. In some embodiments, the FLL includes a second synthesizer that tracks the adjustments to the first synthesizer.

Furthermore, restoring the frequency lock may occur over a time interval. Consequently, prior to storing the adjustments, the interface circuit may average the adjustments over a time scale corresponding to the time interval. Alternatively or additionally, the adapting being performed on a longer time scale than the adjusting. For example, the adapting may be performed periodically, such as with a periodicity that is a fraction of the time interval.

Additionally, the transmit times may include second counter values corresponding to the second clock and the receive times may include counter values corresponding to the clock. Note that when the interface circuit or the second interface circuit is reset, a counter in the electronic device that provided the counter values and/or a second counter in the second electronic device that provided the second counter values may be reset. In these embodiments, the interface circuit may include a sample-and-hold circuit that mirrors a current counter value of the counter when the interface circuit or the second interface circuit is reset.

In some embodiments, the receive times are associated with a wireless ranging capability of the interface circuit.

Another embodiment provides a computer-readable storage medium for use with the interface circuit in the electronic device. This computer-readable storage medium includes instructions for at least some of the operations performed by the electronic device.

Another embodiment provides a method for reducing relative drift. This method includes at least some of the operations performed by the electronic device.

Another embodiment provides the second electronic device.

A fourth group of described embodiments includes an electronic device. This electronic device includes: a system clock circuit, a processor, one or more antennas, an interface circuit, and an interface clock circuit. During operation, the system clock circuit provides a system clock in the electronic device, the processor executes software, the interface communicates with a second electronic device using wireless communication, and the interface clock circuit provides an interface clock in the electronic device. Moreover, the interface circuit may receive, via the wireless communication, packets from the second electronic device, where a given packet includes a transmit time, based on a second interface clock in the second electronic device when the second electronic device transmitted the given packet. In response, the interface circuit may store receive times, based on the interface clock, when the packets were received. Furthermore, the interface circuit may receive, via the wireless communication, information from the second electronic device specifying a future time when the electronic device is to perform a playback operation.

Additionally, the processor may maintain coordinates between the system clock and the interface clock (e.g., by adjusting the system clock), where the interface clock has a higher frequency than the system clock. Then, the processor may calculate, based on differences between the transmit times and the receive times, relative drift as a function of time between the interface clock and the second interface clock. Moreover, the processor may adjust, based on the relative drift, the system clock circuit to eliminate the relative drift, where the relative drift, which is based on the interface clock, provides higher resolution than the system clock. Next, the processor may determine a remaining time offset between the interface clock and the second interface clock. Furthermore, the processor may modify the future time based on the remaining time offset to determine a corrected future time, and may perform the playback operation at the corrected future time.

Note that the transmit time may be included in the given packet in a payload and/or a media access control (MAC) header. In some embodiments, the packets include control packets. Alternatively or additionally, the packets may include data packets.

In some embodiments, prior to performing the playback operation, the processor: disables interrupts in the electronic device; and occupies at least a portion of a software stack by executing a loop to reduce a latency associated with performing the playback operation.

Moreover, the electronic device may include memory that stores instructions for the maintaining, calculating, adjusting, determining, modifying and performing.

Furthermore, the transmit time and the receive time may be stored on opposite ends of a payload of the given packet. In these embodiments, the processor may determine a duration of the payload and may add the duration to the remaining offset time.

Additionally, the packets may include audio data in payloads, and the electronic device stores the audio data in a queue. In these embodiments, the playback operation includes outputting the audio data from the queue.

Note that the adjusting of the system clock and the modifying of the future time may coordinate the playback operation in a clock domain of the interface clock to within a predefined value of a clock domain of the second interface clock.

Moreover, the second electronic device may be a master and the electronic device may be a slave.

Furthermore, the receive times may be associated with a wireless ranging capability of the interface circuit.

Additionally, when a reset of the interface circuit or a second interface circuit in the second electronic device occurs, the processor may mirror the interface clock by sampling and holding a counter value in a counter in the interface circuit that corresponds to the interface clock prior to the counter being reset. In these embodiments, the mirrored counter value may allow the interface circuit to reduce the relative drift while the interface circuit restores frequency lock with the second interface clock based on additional packets with the additional transmit times that are received by the interface circuit from the second electronic device.

Another embodiment provides a computer-readable storage medium for use with the interface circuit and/or the processor in the electronic device. This computer-readable storage medium includes instructions for at least some of the operations performed by the electronic device.

Another embodiment provides a method for coordinating a playback operation. This method includes at least some of the operations performed by the electronic device.

Another embodiment provides the second electronic device.

A fifth group of described embodiments includes an electronic device. This electronic device includes: a system clock circuit, a processor, one or more antennas, an interface circuit, and an interface clock circuit. During operation, the system clock circuit provides a system clock in the electronic device, the processor executes software, the interface communicates with a second electronic device using wireless communication, and the interface clock circuit provides an interface clock in the electronic device. Moreover, the interface circuit may receive, via the wireless communication, packets from the second electronic device, where a given packet includes time-coordination information based on a second interface clock in the second electronic device. In response, the interface circuit may coordinate the interface clock with the second interface clock based on the time-coordination information. Furthermore, the interface circuit may receive, via the wireless communication, information from the second electronic device specifying a future time when the electronic device is to perform a playback operation.

Additionally, the processor may capture timing information associated with the interface clock or a reference clock that is used by the interface clock circuit to generate the interface clock to increase a resolution of the system clock, where the interface clock has a higher frequency than the system clock. Then, the processor may track, using the timing information, relative drift as a function of time between the system clock and the interface clock, and may determine, based on the relative drift, an estimated time offset between the interface clock and the system clock at the future time. Next, the processor may modify the future time based on the estimated time offset to determine a corrected future time, and may perform the playback operation at the corrected future time.

Note that the transmit time may be included in the given packet in a payload and/or a media access control (MAC) header. In some embodiments, the packets include control packets. Alternatively or additionally, the packets may include data packets.

In some embodiments, prior to performing the playback operation, the processor: disables interrupts in the electronic device; and occupies at least a portion of a software stack by executing a loop to reduce a latency associated with performing the playback operation.

Moreover, the electronic device may include memory that stores instructions for the capturing, tracking, determining, modifying and performing.

Furthermore, the capturing of the timing information may involve storing time values of the interface clock in a register or a counter.

Additionally, the electronic device may include an oscillator that provides the reference clock, and the interface clock circuit may provide the interface clock based on the reference clock. In these embodiments, the timing information is captured from the reference clock.

Moreover, the interface circuit may receive additional packets that include audio data in payloads. Alternatively or additionally, at least some of the audio data may be received in the same packet(s) as the information. In these embodiments, the electronic device stores the audio data in a queue, and the playback operation includes outputting the audio data from the queue.

Note that the capturing, tracking, determining and modifying may coordinate the playback operation within a predefined value of the clock domain of the second interface clock.

Furthermore, the second electronic device may be a master and the electronic device may be a slave.

Additionally, the receive times may be associated with a wireless ranging capability of the interface circuit.

Another embodiment provides a computer-readable storage medium for use with the interface circuit and/or the processor in the electronic device. This computer-readable storage medium includes instructions for at least some of the operations performed by the electronic device.

Another embodiment provides a method for coordinating a playback operation. This method includes at least some of the operations performed by the electronic device.

Another embodiment provides the second electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
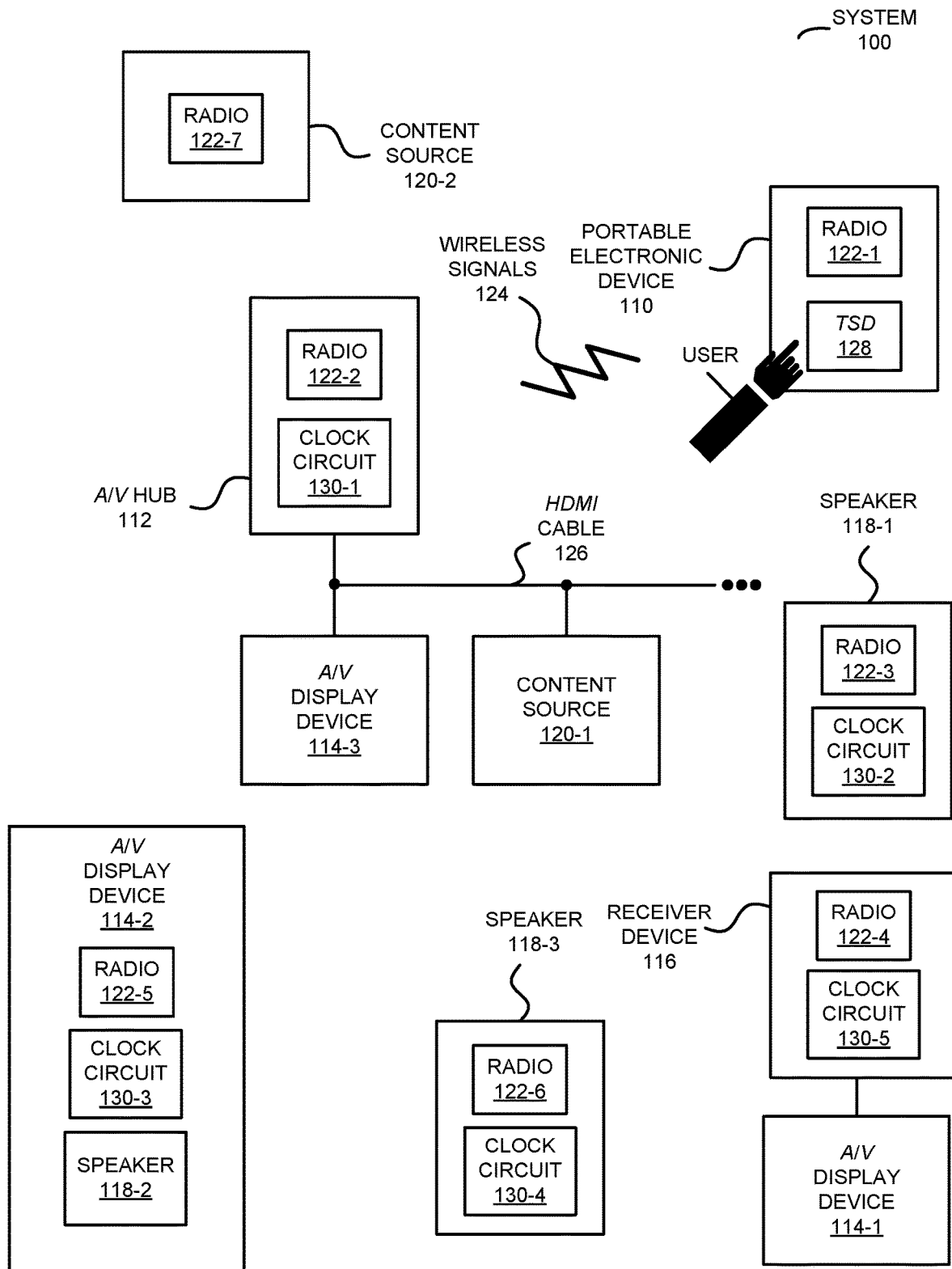
FIG. 1 is a block diagram illustrating an example of a system with electronic devices in accordance with an embodiment of the present disclosure.

In a first group of embodiments, an electronic device coordinates a playback operation. In particular, an interface circuit in the electronic device may calculate, based on differences between transmit times when packets were transmitted by a second electronic device and receive times of the packets, relative drift as a function of time between a clock in the interface circuit and a second clock in the second electronic device. Then, the interface circuit may adjust, based on the relative drift, a clock circuit that provides the clock to eliminate the relative drift, and may determine a remaining time offset between the clock and the second clock. Next, the interface circuit may modify a future time when the electronic device is to perform the playback operation based on the remaining time offset to determine a corrected future time, and the electronic device may perform the playback operation at the corrected future time.

By coordinating the playback operation, such as the playback of audio content, this coordination technique may provide an improved acoustic experience in an environment that includes the electronic device and/or the second electronic device. For example, the coordination technique may ensure that the playback is within a predefined value of a clock domain of the second clock. This capability may eliminate user perception of drift or changes in the timing of the playback operation, such as flutter echo. In addition, the capability may facilitate surround sound or multi-channel sound. In these ways, the coordination technique may improve the user experience when using the electronic device and/or the second electronic device. Consequently, the coordination technique may increase customer loyalty and revenue of a provider of the electronic device electronic device and/or the second electronic device.

In a second group of embodiments, an electronic device coordinates a playback operation. In particular, an interface circuit in the electronic device may calculate, based on differences between transmit times when packets were transmitted by a second electronic device and receive times of the packets, relative drift as a function of time between a clock in the interface circuit and a second clock in the second electronic device. Then, the interface circuit may adjust, based on the relative drift, a clock circuit that provides the clock to eliminate the relative drift, and may determine a remaining time offset between the clock and the second clock. Next, the interface circuit may modify a future time when the second electronic device is to perform the playback operation based on the remaining time offset to determine a corrected future time, and may transmit information to the second electronic device specifying the corrected future time.

By coordinating the playback operation, such as the playback of audio content, this coordination technique may provide an improved acoustic experience in an environment that includes the electronic device and/or the second electronic device. For example, the coordination technique may ensure that the playback is within a predefined value of a clock domain of the clock. This capability may eliminate user perception of drift or changes in the timing of the playback operation, such as flutter echo. In addition, the capability may facilitate surround sound or multi-channel sound. In these ways, the coordination technique may improve the user experience when using the electronic device and/or the second electronic device. Consequently, the coordination technique may increase customer loyalty and revenue of a provider of the electronic device and/or the second electronic device.

In a third group of embodiments, an electronic device reduces relative drift. In particular, an interface circuit in the electronic device may calculate, based on differences between transmit times when packets were transmitted by a second electronic device and receive times of the packets, relative drift as a function of time between a clock in the interface circuit and a second clock in the second electronic device. Then, the interface circuit may adjust, based on the relative drift, a clock circuit that provides the clock to eliminate the relative drift, and may store the adjustments to the clock circuit. Furthermore, when a wireless reset occurs, the interface circuit may adapt the clock circuit based on the stored adjustments to reduce the relative drift while the interface circuit restores frequency lock with the second clock based on additional packets with additional transmit times that are received from the second electronic device.

By reducing drift, this coordination technique may maintain coordination of a playback operation performed by the electronic device, such as the playback of audio content. In the process, the coordination technique may provide an improved acoustic experience in an environment that includes the electronic device and/or the second electronic device. For example, the coordination technique may ensure that the playback is within a predefined value of a clock domain of the second clock. This capability may eliminate user perception of drift or changes in the timing of the playback operation, such as flutter echo. In addition, the capability may facilitate surround sound or multi-channel sound. In these ways, the coordination technique may improve the user experience when using the electronic device and/or the second electronic device. Consequently, the coordination technique may increase customer loyalty and revenue of a provider of the electronic device and/or the second electronic device.

In a fourth group of embodiments, an electronic device coordinates a playback operation. In particular, a processor in the electronic device may maintain coordination between a system clock provided by a system clock circuit and an interface clock provided by a clock circuit. Then, the processor may calculate, based on differences between transmit times when packets were transmitted by a second electronic device and receive times of the packets, relative drift as a function of time between the interface clock and a second interface clock in the second electronic device. Moreover, the processor may adjust, based on the relative drift, the system clock circuit to eliminate the relative drift. Next, the processor may determine a remaining time offset between the interface clock and the second interface clock. Furthermore, the processor may modify a future time when the electronic device is to perform the playback operation based on the remaining time offset to determine a corrected future time, and may perform the playback operation at the corrected future time.

By coordinating the playback operation, such as the playback of audio content, this coordination technique may provide an improved acoustic experience in an environment that includes the electronic device and/or the second electronic device. For example, the coordination technique may ensure that the playback is within a predefined value of a clock domain of the second clock. This capability may eliminate user perception of drift or changes in the timing of the playback operation, such as flutter echo. In addition, the capability may facilitate surround sound or multi-channel sound. In these ways, the coordination technique may improve the user experience when using the electronic device and/or the second electronic device. Consequently, the coordination technique may increase customer loyalty and revenue of a provider of the electronic device electronic device and/or the second electronic device.

In a fifth group of embodiments, an electronic device coordinates a playback operation. In particular, a processor in the electronic device may coordinate an interface clock in the electronic device with a second interface clock in a second electronic device based on time-coordination information received in packets from the second electronic device. Then, the processor may capture timing information associated with the interface clock provided by an interface clock circuit to increase a resolution of a system clock. Moreover, the processor may track, using the timing information, relative drift as a function of time between the system clock and the interface clock, and may determine, based on the relative drift, an estimated time offset between the interface clock and the system clock at the future time. Next, the processor may modify a future time when the electronic device is to perform the playback operation based on the estimated time offset to determine a corrected future time, and may perform the playback operation at the corrected future time.

By coordinating the playback operation, such as the playback of audio content, this coordination technique may provide an improved acoustic experience in an environment that includes the electronic device and/or the second electronic device. For example, the coordination technique may ensure that the playback is within a predefined value of a clock domain of the second clock. This capability may eliminate user perception of drift or changes in the timing of the playback operation, such as flutter echo. In addition, the capability may facilitate surround sound or multi-channel sound. In these ways, the coordination technique may improve the user experience when using the electronic device and/or the second electronic device. Consequently, the coordination technique may increase customer loyalty and revenue of a provider of the electronic device electronic device and/or the second electronic device.

In the discussion that follows, the electronic device and/or the second electronic device, such as an audio/video (A/V) hub, an A/V display device, a portable electronic device, a receiver device, a speaker and/or a consumer-electronic device, may include radios that wirelessly communicate packets or frames in accordance with one or more communication protocols, such as: an Institute of Electrical and Electronics Engineers (IEEE) 802.11 standard (which is sometimes referred to as Wi-Fi®, from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used (such as Ethernet). In addition, the wireless communication may occur via a wide variety of frequency bands, such as at or in: a 2 GHz wireless band, a 5 GHz wireless band, an ISM band, a 60 GHz wireless band, ultra-wide band, etc. Note that the electronic devices may communicate using infra-red communication that is compatible with an infra-red communication standard (including unidirectional or bidirectional infra-red communication).

Moreover, A/V content in following discussion may include video and associated audio (such as music, sound, dialog, etc.), video only or audio only.

Communication among electronic devices is shown in FIG. 1, which presents a block diagram illustrating an example of a system 100 with a portable electronic device 110 (such as a remote control or a cellular telephone), one or more A/V hubs (such as A/V hub 112, and more generally a physical or software-based access point), one or more A/V display devices 114 (such as a television, a monitor, a computer and, more generally, a display associated with an electronic device), one or more receiver devices (such as receiver device 116, e.g., a local wireless receiver associated with a proximate A/V display device 114-1 that can receive frame-by-frame transcoded A/V content from A/V hub 112 for display on A/V display device 114-1), one or more speakers 118 (and, more generally, one or more electronic devices that include one or more speakers) that can receive and output audio data or content, and/or one or more content sources 120 associated with one or more content providers. For example, the one or more content sources 120 may include: a radio receiver, a video player, a satellite receiver, an access point that provides a connection to a wired network such as the Internet, a media or a content source, a consumer-electronic device, an entertainment device, a set-top box, over-the-top content delivered over the Internet or a network without involvement of a cable, satellite or multiple-system operator, a security camera, a monitoring camera, etc. Note that A/V hub 112, A/V display devices 114, receiver device 116 and speakers 118 are sometimes collectively referred to as 'components' in system 100. However, A/V hub 112, A/V display devices 114, receiver device 116 and/or speakers 118 are sometimes referred to as 'electronic devices.'

In particular, portable electronic device 110 and A/V hub 112 may communicate with each other using wireless communication, and one or more other components in system 100 (such as at least: one of A/V display devices 114, receiver device 116, one of speakers 118 and/or one of content sources 120) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as information specifying communication performance, data, audio and/or video content, timing information, etc.).

Figure 18:
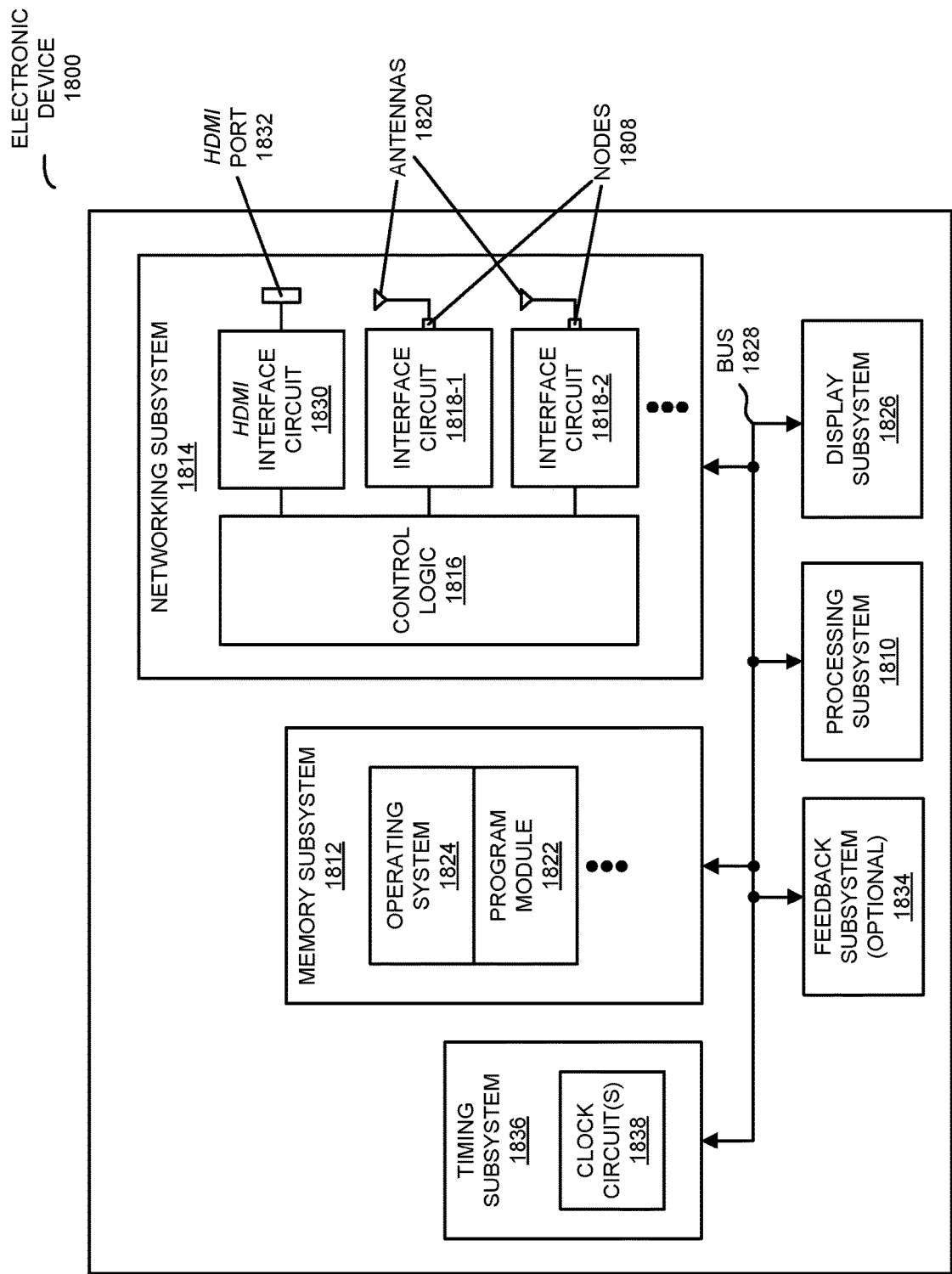
FIG. 18 is a block diagram illustrating an example of one of the electronic devices of FIG. 1 in accordance with an embodiment of the present disclosure.

As described further below with reference to FIG. 18, portable electronic device 110, A/V hub 112, A/V display devices 114, receiver device 116, speakers 118 and content sources 120 may include subsystems, such as: a networking subsystem, a memory subsystem and a processor subsystem. In addition, portable electronic device 110, A/V hub 112, receiver device 116, and/or speakers 118, and optionally one or more of A/V display devices 114 and/or content sources 120, may include radios 122 in the networking subsystems. Note that in some embodiments a radio or receiver device is in an A/V display device, e.g., radio 122-5 is included in A/V display device 114-2.) Moreover, note that radios 122 may be instances of the same radio or may be different from each other. More generally, portable electronic device 110, A/V hub 112, receiver device 116 and/or speakers 118 (and optionally A/V display devices 114 and/or content sources 120) can include (or can be included within) any electronic devices with the networking subsystems that enable portable electronic device 110, A/V hub 112 receiver device 116 and/or speakers 118 (and optionally A/V display devices 114 and/or content sources 120) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 124 (represented by a jagged line) are transmitted from radio 122-1 in portable electronic device 110. These wireless signals are received by at least one of: A/V hub 112, receiver device 116 and/or at least one of speakers 118 (and, optionally, one or more of A/V display devices 114 and/or content sources 120). For example, portable electronic device 110 may transmit packets. In turn, these packets may be received by a radio 122-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112 and/or one or more other components in system 100. More generally, wireless signals may be transmitted and/or received by one or more of the components in system 100.

In the described embodiments, processing of a packet or frame in portable electronic device 110, A/V hub 112, receiver device 116 and/or speakers 118 (and optionally one or more of A/V display devices 114 and/or content sources 120) includes: receiving wireless signals 124 with the packet or frame; decoding/extracting the packet or frame from received wireless signals 124 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display (TSD) 128 in portable electronic device 110, which a user of portable electronic device 110 uses to control at least: A/V hub 112, at least one of A/V display devices 114, at least one of speakers 118 and/or at least one of content sources 120. (In some embodiments, instead of or in additional to touch-sensitive display 128, portable electronic device 110 includes a user interface with physical knobs and/or buttons that a user can use to control at least: A/V hub 112 one of A/V display devices 114, at least one of speakers 118 and/or one of content sources 120.) Alternatively, the information from portable electronic device 110, A/V hub 112, one or more of A/V display devices 114, receiver device 116, one or more of speakers 118 and/or one or more of content sources 120 may specify communication performance about the communication between portable electronic device 110 and one or more other components in system 100. Moreover, the information from A/V hub 112 may include device-state information about a current device state of at least one of A/V display devices 114, at least one of speakers 118 and/or one of content sources 120 (such as on, off, play, rewind, fast forward, a selected channel, selected A/V content, a content source, etc.), or may include user-interface information for the user interface (which may be dynamically updated based on the device-state information and/or the user-interface activity information). Furthermore, the information from at least A/V hub 112 and/or one of content sources 120 may include audio and/or video (which is sometimes denoted as 'audio/video' or content) that are displayed or presented on one or more of A/V display devices 114, as well as display or presentation instructions that specify how the audio and/or video are to be displayed, presented or output. However, as noted previously, the audio and/or video may be communicated between components in system 100 via wired communication. Therefore, as shown in FIG. 1, there may be a wired cable or link, such as a high-definition multimedia-interface (HDMI) cable 126, such as between A/V hub 112 and A/V display device 114-3.

Note that A/V hub 112 may determine display instructions (with a display layout) for the A/V content based on a format of a display in A/V display device 114-1. Alternatively, A/V hub 112 can use pre-determined display instructions or A/V hub 112 can modify or transform the A/V content based on the display layout so that the modified or transformed A/V content has an appropriate format for display on the display. Moreover, the display instructions may specify information to be displayed on the display in A/V display device 114-1, including where A/V content is displayed (such as in a central window, in a tiled window, etc.). Consequently, the information to be displayed (i.e., an instance of the display instructions) may be based on a format of the display, such as: a display size, display resolution, display aspect ratio, display contrast ratio, a display type, etc. In some embodiments, the A/V content includes HDMI content. However, in other embodiments A/V content that is compatible with another format or standard, such as: H.264, MPEG-2, a QuickTime video format, MPEG-4, MP4, and/or TCP/IP. Moreover, the video mode of the A/V content may be 720p, 1080i, 1080p, 1440p, 2000, 2160p, 2540p, 4000p and/or 4320p.

Alternatively or additionally, the display instructions determined by A/V hub 112 for the A/V content may be based on a desired acoustic effect (such as monophonic, stereophonic or multi-channel sound), a desired acoustic equalization, predefined acoustic characteristics of a surrounding environment (such as an acoustic transfer function, acoustic loss, acoustic delay, acoustic noise in the environment, ambient sound in the environment, and/or one or more reflections) and/or a current location of one or more users in the environment relative to A/V display device 114-1 and/or one or more of speakers 118. For example, the display instructions may include a temporal relationship or coordination among the playback times of audio output by speakers 118 to achieve the desired acoustic effect.

Furthermore, note that when A/V hub 112 receives the A/V content from one of content sources 120, A/V hub 112 may provide the A/V content and display instructions to A/V display device 114-1 and/or one or more of speakers 118 as frames or packets with the A/V content are received from one of content sources 120 (e.g., in real time), so that the A/V content is displayed on the display in A/V display device 114-1 and/or is output by one or more of speakers 118. For example, A/V hub 112 may collect the A/V content in a buffer until an audio or video frame is received, and then A/V hub 112 may provide the complete frame to A/V display device 114-1 and/or one or more of speakers 118. Alternatively, A/V hub 112 may provide packets with portions of an audio or video frame to A/V display device 114-1 and/or one or more of speakers 118 as they are received. In some embodiments, the display instructions may be provided to A/V display device 114-1 and/or one or more of speakers 118 differentially (such as when the display instructions change), regularly or periodically (such as one of every N frames or packets) or in each packet.

Moreover, note that the communication between portable electronic device 110, A/V hub 112, one or more of A/V display devices 114, receiver device 116, one or more of speakers 118 and/or one or more content sources 120 may be characterized by a variety of performance metrics, such as: a received signal strength indicator (RSSI), a data rate, a data rate discounting radio protocol overhead (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated maximum data rate (which is sometimes referred to as 'utilization'). Moreover, the performance during the communication associated with different channels may be monitored individually or jointly (e.g., to identify dropped packets).

The communication between portable electronic device 110, A/V hub 112, one of A/V display devices 114, receiver device 116 one of speakers 118 and/or one or more of content sources 120 in FIG. 1 may involve one or more independent, concurrent data streams in different wireless channels (or even different communication protocols, such as different Wi-Fi communication protocols) in one or more connections or links, which may be communicated using multiple radios. Note that the one or more connections or links may each have a separate or different identifier (such as a different service set identifier) on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the communication protocol, e.g., a Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users that are viewing A/V content on one or more of A/V display devices 114 and/or listening to audio output by one or more of speakers 118.

As noted previously, a user may control at least A/V hub 112, at least one of A/V display devices 114, at least one of speakers 118 and/or at least one of content sources 120 via the user interface displayed on touch-sensitive display 128 on portable electronic device 110. In particular, at a given time, the user interface may include one or more virtual icons that allow the user to activate, deactivate or change functionality or capabilities of at least: A/V hub 112, at least one of A/V display devices 114, at least one of speakers 118 and/or at least one of content sources 120. For example, a given virtual icon in the user interface may have an associated strike area on a surface of touch-sensitive display 128. If the user makes and then breaks contact with the surface (e.g., using one or more fingers or digits, or using a stylus) within the strike area, portable electronic device 110 (such as a processor executing a program module) may receive user-interface activity information indicating activation of this command or instruction from a touch-screen input/output (I/O) controller, which is coupled to touch-sensitive display 128. (Alternatively, touch-sensitive display 128 may be responsive to pressure. In these embodiments, the user may maintain contact with touch-sensitive display 128 with an average contact pressure that is usually less than a threshold value, such as 10-20 kPa, and may activate a given virtual icon by increase the average contact pressure with touch-sensitive display 128 above the threshold value.) In response, the program module may instruct an interface circuit in portable electronic device 110 to wirelessly communicate the user-interface activity information indicating the command or instruction to A/V hub 112, and A/V hub 112 may communicate the command or the instruction to the target component in system 100 (such as A/V display device 114-1). This instruction or command may result in A/V display device 114-1 turning on or off, displaying A/V content from a particular content source, performing a trick mode of operation (such as fast forward, reverse, fast reverse or skip), etc. For example, A/V hub 112 may request the A/V content from content source 120-1, and then may provide the A/V content to along with display instructions to A/V display device 114-1, so that A/V display device 114-1 displays the A/V content. Alternatively or additionally, A/V hub 112 may provide audio content associated with video content from content source 120-1 to one or more of speakers 118.

As noted previously, it is often challenging to achieve high audio quality in an environment (such as a room, a building, a vehicle, etc.). In particular, achieving high audio quality in the environment typically places strong constraints on coordination of the loudspeakers, such as speakers 118. For example, the coordination may need to be maintained to 1-5 μs accuracy. (Note that these and other numerical values in the discussion are non-limiting exemplary values. Consequently, the accuracy may be different, such as 10 or 50 μs.) In the absence of suitable coordination, the acoustic quality in the environment may be degraded, with a commensurate impact on listener satisfaction and the overall user experience when listening to audio content and/or A/V content.

This challenge may be addressed in the coordination technique by directly or indirectly coordinating speakers 118 with A/V hub 112 (and, thus, with each other). As described below with reference to FIGS. 2-17, in some embodiments coordinated playback of audio content by speakers 118 may be facilitated using wireless communication. In particular, because the speed of light is almost six orders of magnitude faster than the speed of sound, the propagation delay of wireless signals in an environment (such as a room) is negligible relative to the desired coordination accuracy of speakers 118. For example, the desired coordination accuracy of speakers 118 may be on the order of a microsecond, while the propagation delay in a typical room (e.g., over distances of at most 10-30 m) may be one or two orders of magnitude smaller. Consequently, by including information specifying transmit times in packets transmitted by A/V hub 112 to a given one of speakers 118, and by logging or storing the receive times of these packets at the given speaker, the timing of a playback operation (such as playing audio) can be coordinated within a predefined value (such as, e.g., within 1-5 μs). In particular, as described below with reference to FIGS. 2, 3 and 6-8, A/V hub 112 may transmit frames or packets that include transmit times, based on an interface clock provided by clock circuit 130-1 (such as an interface clock circuit in or associated with an interface circuit in A/V hub 112), when A/V hub 112 transmitted the frames or packets, and an interface circuit in one or more of speakers 118 (such as speaker 118-1) may log or store receive times, based on a interface clock provided by clock circuit 130-2 (such as an interface clock circuit in or associated with the interface circuit in speaker 118-1), when the packets were received. Based on the differences between the transmit times and the receive times, the interface circuit in speaker 118-1 may calculate relative drift as a function of time between the interface clock provided by clock circuit 130-1 and the interface clock provided by clock circuit 130-2.

Then, the interface circuit in speaker 118-1 may adjust, based on the relative drift, clock circuit 130-2 to eliminate the relative drift. For example, the interface circuit in speaker 118-1 may adjust a frequency-locked-loop (FLL) circuit in clock circuit 130-2 to frequency lock the interface clock provided by clock circuit 130-1 and the interface clock provided by clock circuit 130-2. Moreover, the interface circuit in speaker 118-1 may determine a remaining time offset between the interface clock provided by clock circuit 130-1 and the interface clock provided by clock circuit 130-2.

This remaining time offset may be used to correct the phase between lock the interface clock provided by clock circuit 130-1 and the interface clock provided by clock circuit 130-2 when performing a playback operation, such as outputting audio data received from A/V hub 112. In particular, the interface circuit in speaker 118-1 may receive, via wireless communication, a frame or a packet with information from A/V hub 112 specifying a future time when speaker 118-1 is to perform the playback operation. Next, the interface circuit in speaker 118-1 may modify the future time based on the remaining time offset to determine a corrected future time, and speaker 118-1 may perform the playback operation at the corrected future time.

Figure 4:
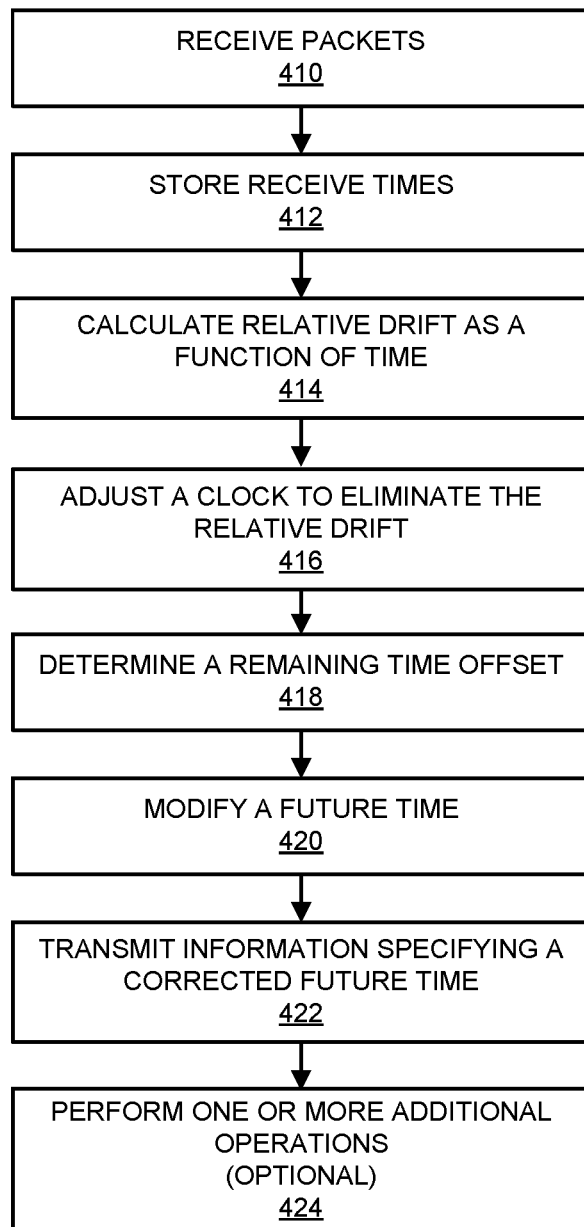
FIG. 4 is a flow diagram illustrating an example of a method for coordinating a playback operation in accordance with an embodiment of the present disclosure.

Alternatively or additionally, as described further below with reference to FIGS. 4 and 5, the roles of A/V hub 112 and speaker 118-1 in the coordination technique may be reversed, such that A/V hub 112 performs at least some of the aforementioned operations performed by speaker 118-1. Thus, instead of A/V hub 112 transmitting packets with the transmit times to speaker 118-1, speaker 118-1 may transmitted the packets to A/V hub 112. Then, A/V hub 112 may perform analogous operations to those of speaker 118-1 described above, and may transmit a frame or a packet to speaker 118-1 with information specifying the corrected future time to speaker 118-1.

Moreover, as described further below with reference to FIGS. 9-12, in order to reduce or eliminate drift between the interface clock provided by clock circuit 130-1 and the interface clock provided by clock circuit 130-2 after a wireless reset in the interface circuit in A/V hub 112 and/or in the interface circuit in speaker 118-1, in some embodiments the interface circuit in speaker 118-1 may adapt clock circuit 130-2 based on stored previous adjustments to clock circuit 130-2. For example, the interface circuit in speaker 118-1 may adjust an FLL circuit in clock circuit 130-2 (such as a seed of a synthesizer in the FLL circuit) based on an average of previous adjustments to clock circuit 130-2. In this way, the coordination of the playback operation may be maintained within the predefined value while the interface circuit in speaker 118-1 restores the frequency lock with the interface clock provided by clock circuit 130-1 based on additional packets with additional transmit times that are received from A/V hub 112. Alternatively or additionally, at least some of the aforementioned operations performed by speaker 118-1 during the wireless reset may be performed by A/V hub 112.

While the preceding embodiments achieve and/or maintain the coordination of the playback operation between the clock domain of A/V hub 112 and the clock domain of speaker 118-1 to within the predefined value using the interface circuit in A/V hub 112 and/or speaker 118-1, in other embodiments the coordination of the playback operation is performed, at least in part, using software executed by a processor. This is described further below with reference to FIGS. 13-17. Note that while these embodiments illustrate a processor in speaker 118-1 executing the software, in other embodiments at least some of the operation performed by the processor in speaker 118-1 are performed by a processor executing software in A/V hub 112.

In some embodiments, techniques such as wireless ranging or radio-based distance measurements may be used to facilitate coordination of the playback operation. For example, wireless ranging may be used to determine and correct for the propagation delay of light between A/V hub 112 and/or speaker 118-1 when it is not at least one or two orders of magnitude smaller than the predefined value, such as when A/V hub 112 and speaker 118-1 are in different rooms. (When the distances are within a room and the electronic devices are stationary, the propagation delay introduces a negligible static contribution to the remaining time offset.) Typically, the distance between A/V hub 112 and speaker 118-1 is determined based on the product of the time of flight (the difference of the transmit time and the receive time in a common clock domain) and the speed of propagation.

Moreover, one or more additional techniques may be used to identify and/or exclude multi-path wireless signals during the coordination of playback operation. For example, A/V hub 112 and/or speakers 118 may determine the angle of arrival (including non-line-of-sight reception) using: a directional antenna, the differential time of arrival at an array of antennas with known location(s), and/or the angle of arrival at two radios having known location (e.g., trilateration or multilateration).

While the preceding example illustrated wireless ranging with a common clock domain in A/V hub 112 and/or speaker 118-1, in other embodiments the wireless ranging is performed when the interface clock provided by clock circuit 130-1 and the interface clock provided by clock circuit 130-2 are not coordinated. For example, the position of A/V hub 112 and/or speakers 118 may be estimated based on the speed of propagation and the time of arrival data of wireless signals 124 at several receivers at different known locations (which is sometimes referred to as 'differential time of arrival') even when the transmission time is unknown or unavailable. More generally, a variety of radiolocation techniques may be used, such as: determining distance based on a difference in the power of the received signal strength indicator (RSSI) relative to the original transmitted signal strength (which may include corrections for absorption, refraction, shadowing and/or reflection); determining the angle of arrival at a radio (including non-line-of-sight reception) using a directional antenna or based on the differential time of arrival at an array of antennas with known location(s); determining the distance based on backscattered wireless signals; and/or determining the angle of arrival at least two radios having known location (i.e., trilateration or multilateration). Note that wireless signals 124 may include transmissions over GHz or multi-GHz bandwidths to create pulses of short duration (such as, e.g., approximately 1 ns), which may allow the distance to be determined within 0.3 m (e.g., 1 ft). In some embodiments, the wireless ranging is facilitated using location information, such as a location of one or more of electronic devices in FIG. 1 that are determined or specified by a local positioning system, a Global Positioning System, a cellular-telephone network and/or a wireless network.

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames. While electronic devices in FIG. 1 are illustrated with a single instance of radios 122, in other embodiments one or more of these components may include multiple radios.

Coordination of a Playback Operation Using an Interface Circuit

Figure 2:
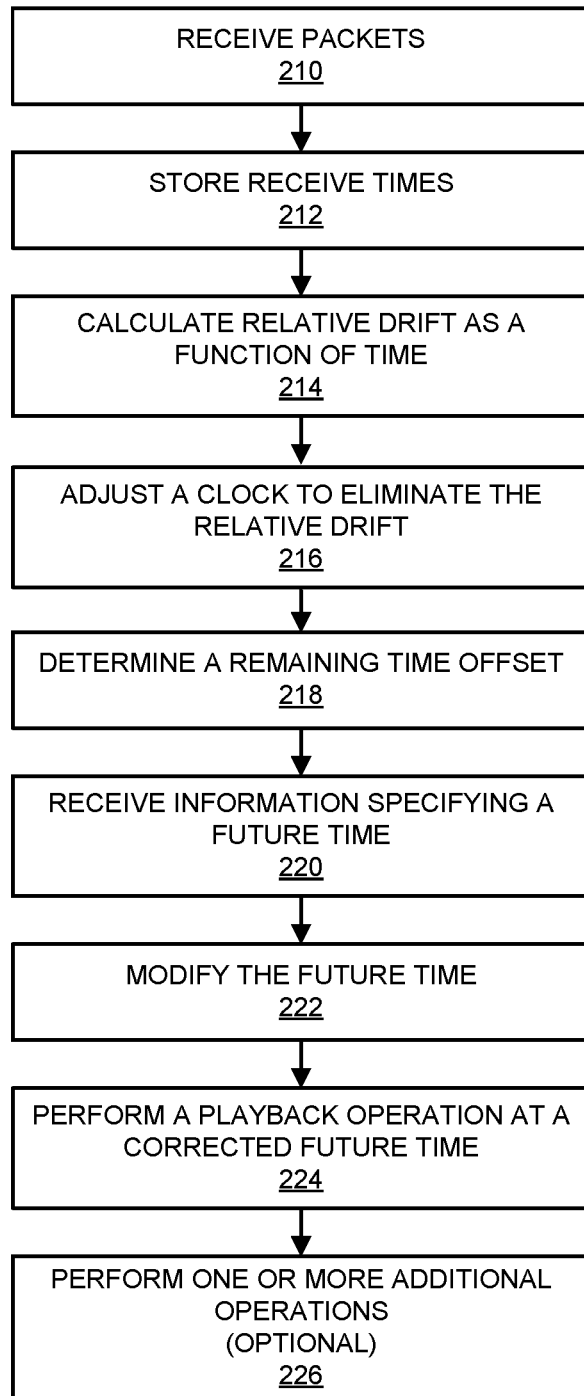
FIG. 2 is a flow diagram illustrating an example of a method for coordinating a playback operation in accordance with an embodiment of the present disclosure.

We now describe embodiments of the coordination technique. In some embodiments, the coordination technique is implemented, at least in part, using hardware, such as an interface circuit. This is shown in FIG. 2, which presents a flow diagram illustrating an example of a method 200 for coordinating a playback operation. Method 200 may be performed by an interface circuit in an electronic device (which may be a slave) such as one of A/V display devices 114 (FIG. 1) or one of speakers 118 (FIG. 1).

During operation, the interface circuit may receive, via wireless communication, packets (operation 210) from a second electronic device (which may be a master), where a given packet includes a transmit time, based on a second clock in the second electronic device when the second electronic device transmitted the given packet. Note that the transmit time may be included in the given packet in a payload and/or a media access control (MAC) header. In some embodiments, the packets include control packets. Alternatively or additionally, the packets may include data packets.

In response to receiving the packet(s), the interface circuit may store receive times (operation 212) when the packets were received, where the receive times are based on a clock in the electronic device. Note that the transmit times may correspond to the leading edges or the trailing edges the packets. Similarly, the receive times may correspond to the leading edges or the trailing edges the packets.

Then, the interface circuit may calculate, based on differences between the transmit times and the receive times, relative drift as a function of time (operation 214) between the clock and the second clock, and may adjust, based on the relative drift, a clock circuit (such as an interface clock circuit in or associated with the interface circuit) that provides the clock to eliminate the relative drift (operation 216). For example, the adjustments may be based on the differences for successive packets, and the adjustments may frequency lock the clock and the second clock.

Moreover, the interface circuit may determine a remaining time offset (operation 218) between the clock and the second clock.

Furthermore, the interface circuit may receive, via the wireless communication, information from the second electronic device specifying a future time (operation 220) when the electronic device is to perform the playback operation.

Additionally, the interface circuit may modify the future time (operation 222) based on the remaining time offset to determine a corrected future time.

Next, the electronic device may perform the playback operation at the corrected future time (operation 224), where the adjusting the clock and the modifying the future time coordinate the playback operation in a clock domain of the clock to within a predefined value of a clock domain of the second clock.

In some embodiments, the packets include audio data in payloads, and the electronic device stores the audio data in a queue. In these embodiments, the playback operation includes outputting the audio data from the queue. (However, in other embodiments the playback operation includes displaying video, which may be coordinated with the audio to prevent unintended timing offsets between sound and images that a viewer could notice.) Note that adjusting the clock (operation 216) and the modifying the future time (operation 222) may coordinate the playback operation.

Moreover, the interface circuit (and/or the electronic device) may optionally perform one or more additional operations (operation 226). For example, the transmit time and the receive time may be stored on opposite ends of a payload of the given packet. Thus, the transmit time may be at the beginning of the payload and the receive time may be appended to the end of the payload. In these embodiments, the interface circuit or a processor executing software in the electronic device may determine a duration of the payload and the interface circuit may add the duration to the remaining offset time.

Figure 3:
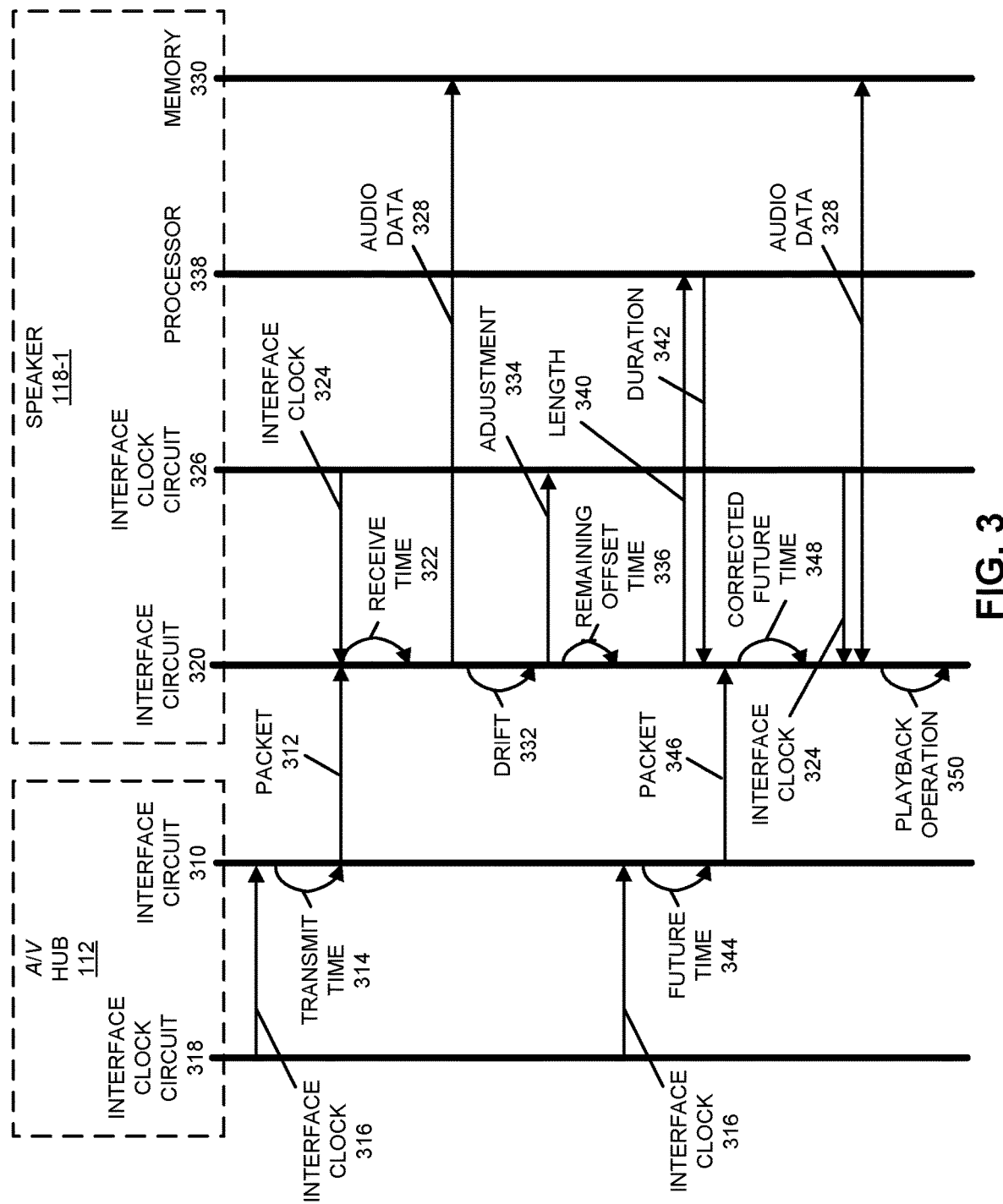
FIG. 3 is a drawing illustrating an example of communication among the electronic devices in FIG. 1 in accordance with an embodiment of the present disclosure.

FIG. 3 presents a drawing illustrating an example of communication among A/V hub 112 and speaker 118-1. In particular, interface circuit 310 in A/V hub 112 may transmit one or more packets (such as packet 312) to speaker 118-1. Each packet may include a corresponding transmit time 314, based on an interface clock 316 provided by an interface clock circuit 318 in or associated with an interface circuit 310 in A/V hub 112, when A/V hub 112 transmitted packet 312. When an interface circuit 320 in speaker 118-1 receives the packets, it may include receive times in the packets (or it may store the receive times in memory 330), where for each packet the corresponding receive time 322 may be based on an interface clock 324 provided by an interface clock circuit 326 in or associated with interface circuit 320.

Then, interface circuit 320 may calculate, based on differences between the transmit times and the receive times, relative drift 332 as a function of time between interface clock 316 and interface clock 324, and may adjust 334, based on relative drift 332, interface clock circuit 326 to eliminate relative drift 332. Moreover, interface circuit 320 may determine a remaining time offset 336 between interface clock 316 and interface clock 324.

In some embodiments, the transmit times and the receive times may be stored on opposite ends of payload of the packets. In these embodiments, interface circuit 3120 or a processor 338 executing software in speaker 118-1 may determine a duration 342 or time associated with a length 340 of the payload and interface circuit 320 may add duration 342 to remaining offset time 336.

Furthermore, interface circuit 310 may transmit packet 346 that includes information that specifies a future time 344 when speaker 118-1 is to perform a playback operation 350. After receiving packet 346, interface circuit 320 may modify future time 344 based on remaining time offset 336 to determine a corrected future time 348.

Next, speaker 118-1 may perform playback operation 350 at corrected future time 348. For example, interface circuit 318 or a processor 338 executing software may perform playback operation 350. In particular, the packets and/or additional packets may include audio data 328 in payloads, and speaker 118-1 may store audio data 328 in a queue in memory 330. In these embodiments, playback operation 350 includes outputting audio data 328 from the queue, including driving an electrical-to-acoustic transducer in speaker 118-1 based on audio data 328 so speaker 118-1 outputs sound. Note that adjusting 334 the interface clock 324 and modifying future time 344 may coordinate playback operation 350 in a clock domain of interface clock 324 to within a predefined value of a clock domain of interface clock 316.

As noted previously, the roles of the clock master and the slave in the coordination technique may be reversed. This is shown in FIG. 4, which presents a flow diagram illustrating an example of a method 400 for coordinating a playback operation. Method 400 may be performed by the second interface circuit in the second electronic device (which may be a slave) such as A/V hub 112 (FIG. 1). During operation, the second interface circuit may receive, via wireless communication, packets (operation 410) from the electronic device (which may be a slave), where a given packet includes a transmit time, based on the clock in the electronic device when the electronic device transmitted the given packet. Note that the transmit time may be included in the given packet in a payload and/or a MAC header. In some embodiments, the packets include control packets. Alternatively or additionally, the packets may include data packets.

In response to receiving the packet(s), the second interface circuit may store receive times (operation 412) when the packets were received, where the receive times are based on the second clock in the second electronic device. Note that the transmit times may correspond to the leading edges or the trailing edges the packets. Similarly, the receive times may correspond to the leading edges or the trailing edges the packets.

Then, the second interface circuit may calculate, based on differences between the transmit times and the receive times, relative drift as a function of time (operation 414) between the second clock and the clock, and may adjust, based on the relative drift, a second clock circuit (such as a second interface clock circuit in or associated with the second interface circuit) that provides the second clock to eliminate the relative drift (operation 416). For example, the adjustments may be based on the differences for successive packets, and the adjustments may frequency lock the clock and the second clock.

Moreover, the second interface circuit may determine a remaining time offset (operation 418) between the second clock and the clock.

Furthermore, the second interface circuit may modify, based on the remaining time offset, a future time (operation 420) when the electronic device is to perform a playback operation to determine a corrected future time.

Next, the second interface circuit may transmit, via the wireless communication, information to the electronic device specifying the corrected future time (operation 422).

In some embodiments, the second interface circuit (and/or the second electronic device) optionally performs one or more additional operations (operation 424). For example, the transmit time and the receive time may be stored on opposite ends of a payload of the given packet. In these embodiments, the second interface circuit or a processor executing software in the second electronic device may determine a duration of the payload and the second interface circuit may add the duration to the remaining offset time.

Furthermore, prior to, concurrently with and/or after transmitting the information (operation 422), the second interface circuit may transmit additional packets that include audio data in payloads, and the playback operation may include outputting the audio data. (However, in some embodiments at least some of the audio data is included in the same packet(s) as the information.) Note that adjusting the second clock (operation 416) and the modifying the future time (operation 420) may coordinate the playback operation in a clock domain of the second clock to within a predefine value of a clock domain of the clock.

Figure 5:
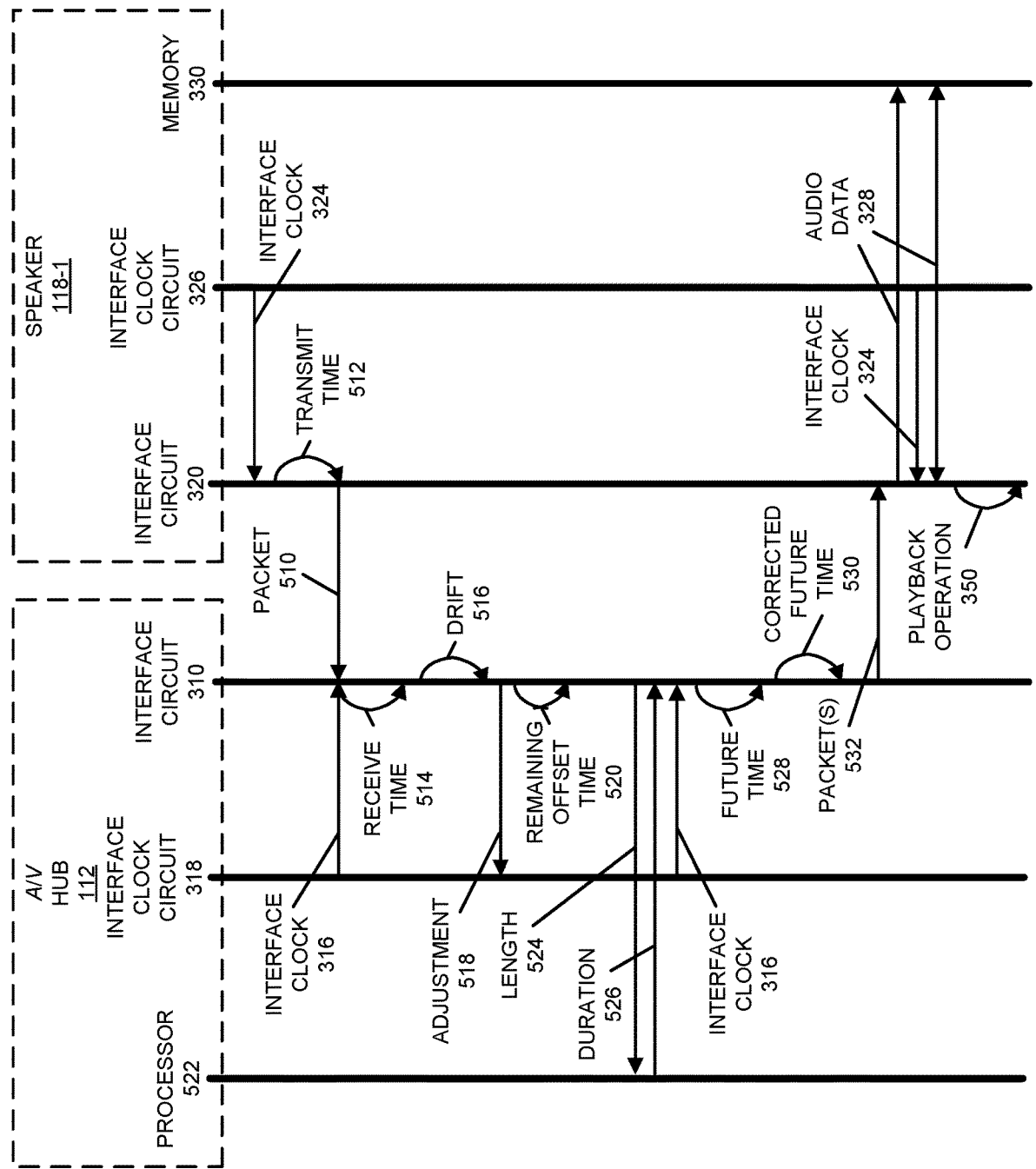
FIG. 5 is a drawing illustrating an example of communication among the electronic devices in FIG. 1 in accordance with an embodiment of the present disclosure.

FIG. 5 presents a drawing illustrating an example of communication among A/V hub 112 and speaker 118-1. In particular, interface circuit 320 in speaker 118-1 may transmit one or more packets (such as packet 510) to A/V hub 112. Each packet may include a corresponding transmit time 512, based on interface clock 324 provided by interface clock circuit 326 in or associated with interface circuit 320 in speaker 118-1, when speaker 118-1 transmitted packet 510. When interface circuit 310 in A/V hub 112 receives the packets, it may include receive times in the packets (or it may store the receive times in memory), where for each packet the corresponding receive time 514 may be based on interface clock 316 (which is sometimes referred to as an 'interface clock') provided by interface clock circuit 318 in or associated with interface circuit 310.

Then, interface circuit 310 may calculate, based on differences between the transmit times and the receive times, relative drift 516 as a function of time between interface clock 316 and interface clock 324, and may adjust 518, based on relative drift 516, interface clock circuit 318 to eliminate relative drift 516. Moreover, interface circuit 310 may determine a remaining time offset 520 between interface clock 316 and interface clock 324.

In some embodiments, the transmit times and the receive times may be stored on opposite ends of payload of the packets. In these embodiments, interface circuit 310 or a processor 522 executing software in A/V hub 112 may determine a duration 526 or time associated with a length 524 of the payload and interface circuit 310 may add duration 526 to remaining offset time 520.

Furthermore, interface circuit 310 may modify, based on remaining time offset 520, a future time 528 when speaker 118-1 is to perform a playback operation 350 to determine a corrected future time 530. Next, interface circuit 310 may transmit one or more packets 532 that includes information that specifies corrected future time 530. In addition, packets 532 may include audio data 328 in payloads.

After interface circuit 320 receives packets 532, speaker 118-1 may store audio data 328 in a queue in memory 330, and speaker 118-1 may perform playback operation 350 at corrected future time 530. For example, interface circuit 320 or a processor executing software may perform playback operation 350. In these embodiments, playback operation 350 includes outputting audio data 328 from the queue, including driving an electrical-to-acoustic transducer in speaker 118-1 based on audio data 328 so speaker 118-1 outputs sound. Note that adjusting 518 interface clock 316 and modifying future time 528 may coordinate playback operation 350 in a clock domain of interface clock 316 to within a predefined value of a clock domain of interface clock 324.

In an exemplary embodiment, the coordination technique is used to provide channel coordination and phasing for surround sound or multi-channel sound. In particular, some individuals can perceive playback coordination variation of 5 μs, which can produce an audible twilight effect. Moreover, if the relative clock drift is sufficiently large, audible flutter can occur between clock adjustments. Furthermore, global playback coordination between speakers and a headset (or headphones) may be needed to avoided jumps or echoes that can degrade the user experience. Consequently, the coordination technique may need to maintain playback coordination of two or more speakers within, e.g., 1-5 μs.

In order to achieve this coordination capability, in some embodiments the coordination technique may include transmit time information in packets transmitted by an interface circuit (i.e., in the physical layer), such as the interface circuit in an A/V hub (which may function as an access point in a wireless local area network) or audio receiver that provides data packets to one or more speakers (and, more generally, a recipient) in a system. In particular, the A/V hub may include a transmit timestamp in each user datagram protocol (UDP) data packet, such as in the payload. Thus, in some embodiments, the coordination may not use an access-point beacon or a specialty packet. Moreover, the communication of the coordination information may be unidirectional, such as from the A/V hub to a speaker or from the speaker to the A/V hub (as opposed to back and forth or bidirectional communication).

Note that the timestamp may include a counter value corresponding to an interface clock in or associated with the interface circuit in the A/V hub. In some embodiments, the counter values are high resolution, such as, e.g., 32 B. For example, the counter values or timestamps are associated with an Integrated Inter-IC Sound Bus (I²S).

When an interface circuit in the recipient receives a packet from the A/V hub, the interface circuit may append a receive time to the payload in the data packet. For example, the receive time may include a counter value corresponding to an interface clock in or associated with the interface circuit in the recipient. In some embodiments, there may be 24 B in a data packet that is used for storing timing information, such as 4 B at the start of the payload that is used to store the transmit time at the A/V hub and 4 B at the end of the payload that is used to store the receive time at the recipient.

Then, using the transmit times (which may provide information about the master time base) and the receive times from multiple packets, the interface circuit may track and correct drift between the clocks in the interface circuits in the A/V hub and the recipient, and may determine the remaining time offset. Next, the interface circuit may use the remaining time offset to modify the future time based on the remaining time offset to determine the corrected future time when the recipient performs the playback operation (such as playback of audio data included in the data packets).

Note that in some embodiments the transmit times and the receive times are included when data packets are, respectively, transmitted and received during a test mode of the interface circuits in the A/V hub and the recipient. This test mode may be set or selected by software executed by processors in the A/V hub and/or the recipient.

Figure 6:
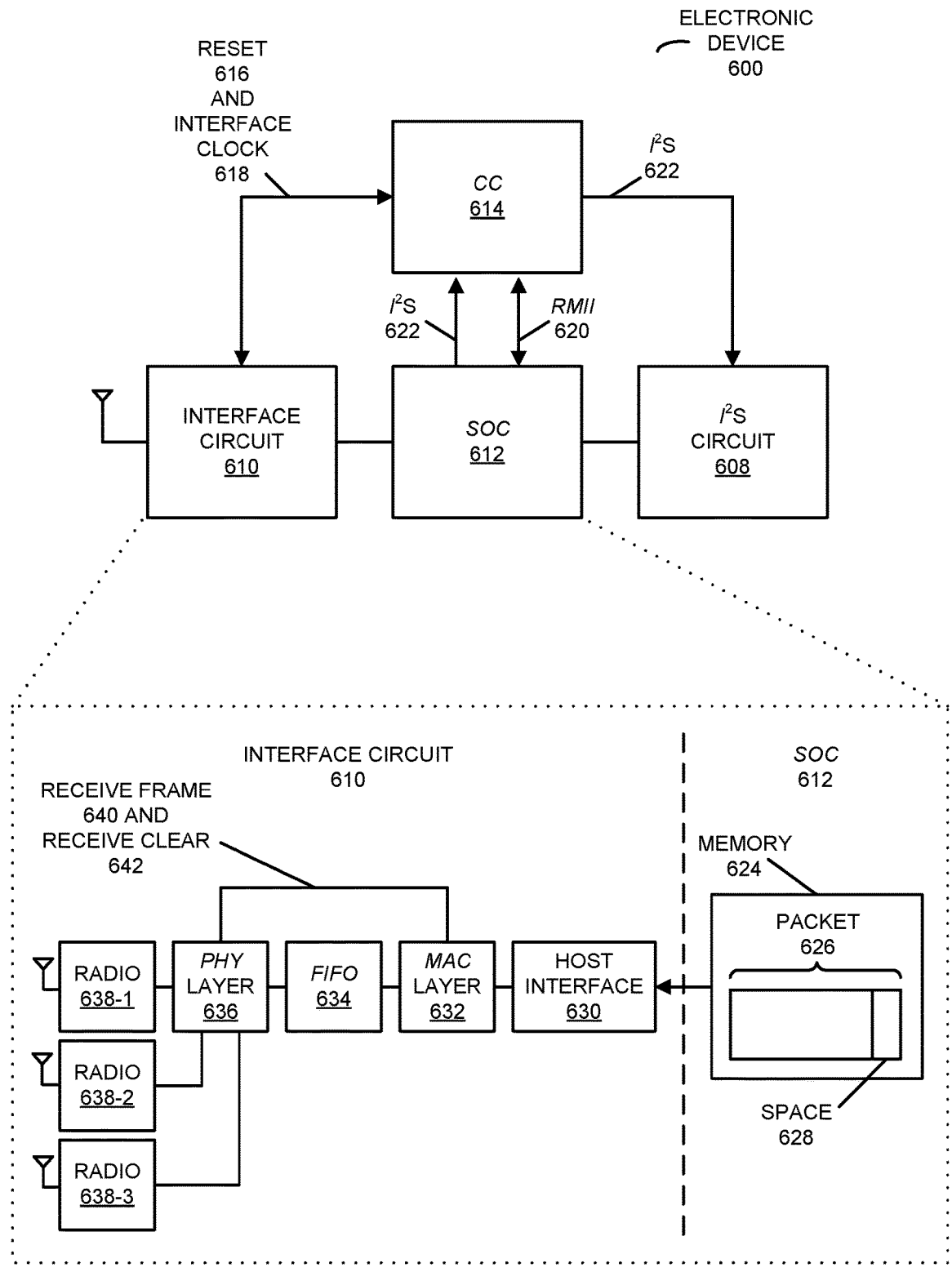
FIG. 6 is a block diagram illustrating an example of an electronic device in FIG. 1 in accordance with an embodiment of the present disclosure.

FIG. 6 presents a block diagram illustrating an example of an electronic device 600. In the discussion that follows, electronic device 600 may include speaker 118-1 in FIG. 1. However, in other embodiments, the flow of coordination information is reversed and electronic device 600 includes A/V hub 112 in FIG. 1.

Electronic device 600 may include: a Wi-Fi interface circuit 610 (which is an example of an interface circuit), a system-on-chip (SOC) 612, and a control circuit (CC) 614 (such as a programmable logic device or a field-programmable logic array). In addition, electronic device 600 may include I²S circuit 608 that in A/V hub 112 (FIG. 1) samples the audio data, and in speaker 118-1 (FIG. 1) plays back the audio data. In order to provide a high-quality listening experience, the timing from an instance of I²S circuit 608 in A/V hub 112 (FIG. 1) to an instance of I²S circuit 608 in speaker 118-1 (FIG. 1) may either be coordinated or relative timing differences may be tracked and used to correct the future playback time. In some embodiments, coordination between I²S circuit 608 and interface circuit 610 is maintained within electronic device (such as by adjusting an I²S clock. Then, instances of interface circuit 610 are frequency locked using the coordination technique.

In particular, a packet 626 of audio data may be assembled and stored in memory 624 in SOC 612. This packet may include space 628 that will be used to store the transmit time and the receive time of a Wi-Fi packet that includes packet 626. Note that packet 626 may include a software timestamp associated with the I²S clock, such as when the audio data is sampled by SOC 612 based on the I²S clock.

Packet 626 may be provided to interface circuit 610 via host interface 630. Then, MAC layer 632 may assemble the MAC Protocol Data Unit (MPDU), which is stored in a first-in first-out 634 buffer. The MPDU may be provided to physical (PHY) layer 636, which assembles the Physical Layer Convergence Protocol (PLCP) Protocol Data Unit (PPDU) into a frame. Next, the frame may be transmitted by one of radios 628.

During transmission, interface circuit 610 may wait for the shared communication channel to be available. When the communication channel is available, the current interface-clock timestamp may be acquired from interface circuit 610, may be stored in hardware in interface circuit 610, and may be added to packet 626. For example, the transmit time may be added by MAC layer 632 or by PHY layer 636.

After transmitting the frame that includes packet 626, interface circuit 610 may wait for an acknowledgment (ACK). After a predefined time interval without an ACK, interface circuit 610 may repeat the process starting with waiting for the shared communication channel to be available. Thus, prior to each attempted transmission of the frame that includes packet 626, a revised transmit time may be included in packet 626.

If a timeout occurs or there are too many retries, interface circuit 610 may signal a transmit failure to SOC 612. Alternatively, if an ACK is received, interface circuit 610 may provide a signal completion to SOC 612, and the transmit time that was stored in interface circuit 610 may be provided to SOC 612.

Similarly, when a frame is received by interface circuit 610, a receive time stamp may be added to an instance of packet 626 by PHY layer 636 or MAC layer 632. As noted previously, the receive time may be associated with the leading edge or the trailing edge of the frame. In particular, the receive time may be based on receive time 640 (which is associated with the leading edge) or receive clear 642 (which is associated with the trailing edge).

As described further below with reference to FIGS. 9-12, when a reset occurs, interface circuit 610 may provide reset 616 to CC 614. In addition, CC 614 may be coupled to SOC 612 by a bidirectional reduced media-independent interface (RMII) 620 and a unidirectional I$^2$S 622. In some embodiments, interface clock 618 has a fundamental frequency of approximately 24.576 MHz (which is sometimes referred to as a '25 MHz clock') and a clock in I$^2$S 622 in or associated with CC 614 has a sampling frequency between 44-192 kHz.

Figure 7:
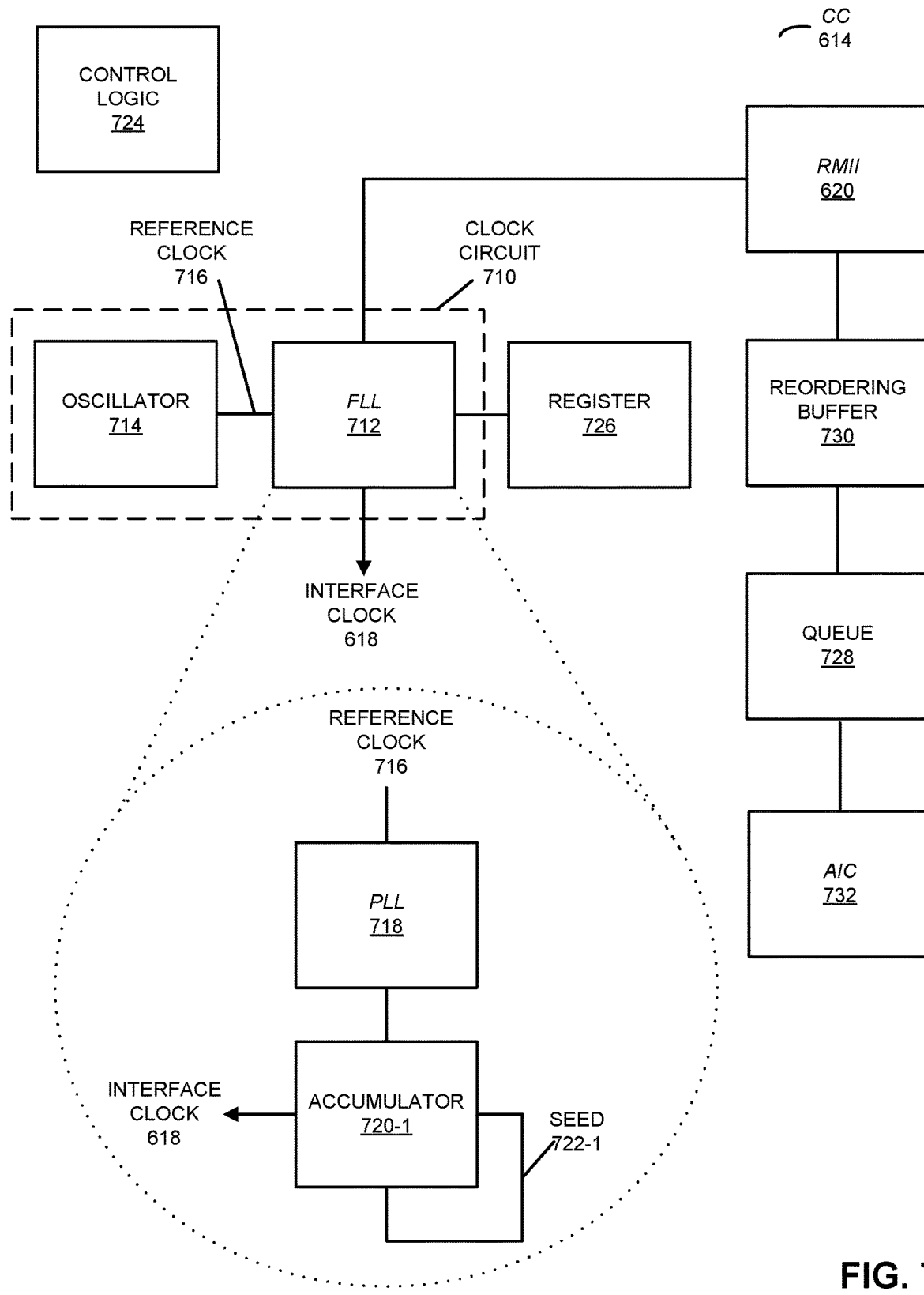
FIG. 7 is a block diagram illustrating an example control circuit in the electronic device in FIG. 6 in accordance with an embodiment of the present disclosure.

FIG. 7 presents a block diagram illustrating an example of CC 614 in FIG. 1. In CC 614, clock circuit 710 may generate interface clock 618 using an FLL 712 based on a reference clock 716 provided by an oscillator 714 (such as a crystal oscillator). Moreover, as shown in the inset, FLL 712 may include a phase-locked loop (PLL) 718 that, effectively, multiplies reference clock 716 by N (such as 12 and, more generally, an integer), and an accumulator 720-1 that, effectively, divides an output from PLL 718 by M (such as 16 and, more generally, the same or a different integer than N). Note that accumulator 720-1 may divide by M based on a seed 722-1, such as 1AAA hexadecimal. In some embodiments, accumulator 720-1 is included in a synthesizer, and FLL 712 generates interface clock 618 using direct digital synthesis.

Furthermore, control logic 724 in electronic device 600 (such as in CC 614 or interface circuit 610 in FIG. 6) may adjust the fundamental frequency of interface clock 618 by adjusting seed 722-1. In order to implement systematic under-relaxation, the adjustments to seed 722-1 may be restricted to increment or decrement by one bit for each data packet.

Based on the relative drift between the clocks in the A/V hub and the recipient (such as speaker 118-1 in FIG. 1), control logic 724 may adjust seed 722-1 to eliminate the relative drift. For example, the relative drift as a function of time may be calculated by control logic 724, and control logic 724 may adjust seed 722-1 based on the relative drift to change the clock speed. This may to adjust the slope versus time of the clock frequency in order to frequency lock interface clock 618 to a corresponding interface clock in the A/V hub (and, thus, to null the relative drift). In some embodiments, the adjustments are based on average or low-pass filtered values of the relative drift (which is determined using the coordination information included in multiple data packets, such as the data packets received over 0.1-1 ms), which may also provide under-relaxation. Alternatively or additionally, the adjustments may be applied to clock circuit 710 at a reduced adjustment rate, such as, e.g., every millisecond.

Moreover, control logic 724 may determine a remaining (DC) time offset (TO) between interface clock 618 and the corresponding interface clock in the A/V hub, which may be stored in a register 726 in electronic device 600 (FIG. 6), such as in CC 614 or interface circuit 610 (FIG. 6). Note that the remaining time offset may be quasi-static. Furthermore, electronic device 600 in FIG. 6, such as software executed by a processor in electronic device 600, may determine a duration of the data packet(s), which is then added by control logic 724 to the remaining time offset. This may be necessary when the transmit time and the receive times are on opposite ends of the payloads in the data packets.

In some embodiments, it takes, e.g., 8-16 ms to frequency lock interface clock 618 and the corresponding interface clock in the A/V hub. In order to accommodate this, as well as a variable latency associated with software executing on electronic device 600 in FIG. 6, audio data in the data packets (which arrives based on interface clock 618) may be stored in a queue 730. This queue may store, e.g., up to 8 ms of audio data. In addition, CC 614 may include a reordering buffer 728, which may reorder audio data that arrives out of sequence from the A/V hub.

When interface circuit 610 (FIG. 6) receives a future time when electronic device 600 (FIG. 6) is to perform the playback operation, control logic 724 may determine a corrected future time based on the received future time and the remaining time offset. Next, at the corrected future time, control logic 724 may perform the playback operation, such as outputting the audio data in queue 730 to audio integrated circuit (AIC) 732 and, then, to a speaker (not shown). In this way, all of the playback times of different recipients may be coordinated.

Figure 8:
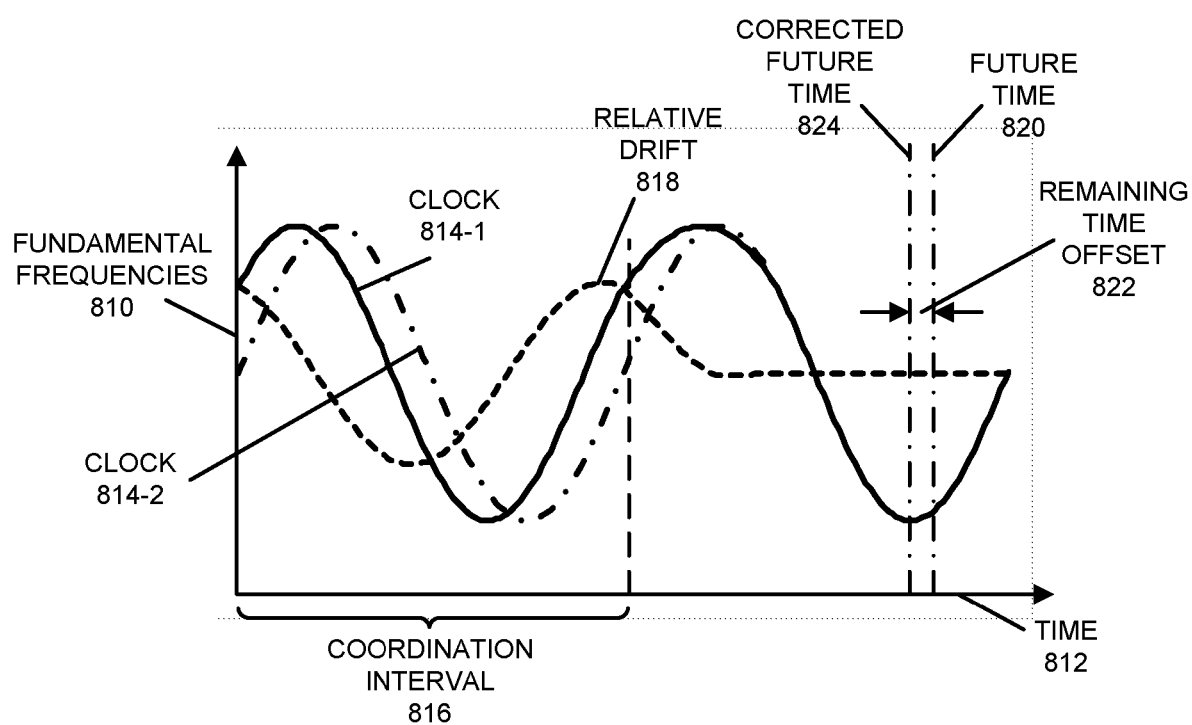
FIG. 8 is a timing diagram illustrating an example of clocks in electronic devices in FIG. 1 in accordance with an embodiment of the present disclosure.

FIG. 8 presents a timing diagram illustrating an example of fundamental frequencies 810 of clocks 814 in electronic devices in FIG. 1, such as interface clocks in the A/V hub and the recipient. After a coordination interval 816, the recipient may eliminate or null relative drift 818 of fundamental frequencies 810 as a function of time 812. Subsequently, a future time 820 when the recipient is to perform the playback operation may be corrected by remaining time offset 822 to determine corrected future time 824, so that the playback operation is coordinated between the A/V hub and the recipient.

While the preceding discussion illustrated the use of the transmit times and the receive times during the test mode of the interface circuits, in other embodiments the transmit times and the receive times are associated with a wireless ranging capability of the interface circuits. For example, when the A/V hub and the recipient are in the same room, the time of flight or the time delay associated with a distance between the A/V hub and the recipient may be ignored or may be included in the remaining time offset. In some embodiments, when the A/V hub and the recipient are in different rooms (such as more than 10-30 m apart), wireless ranging is used to determine and correct for the time delay associated with the distance between the A/V hub and the recipient. In these embodiments, wireless ranging may be used in both directions of communication between the A/V hub and the recipient. Alternatively or additionally, when the A/V hub and the recipient are in different rooms, coordination of the A/V hub and the recipient may involve or use of a coordination technique, such as Network Time Protocol (NAP). In some embodiments, instead of determining the transmit times and/or the receive times using one or more clocks that are generated within electronic device 600 (FIG.

6), the transmit times and/or the receive times are based on one or more external clocks that are supplied to electronic device 600 (FIG. 6).

Coordination of a Playback Operation after a Wireless Reset

Figure 9:
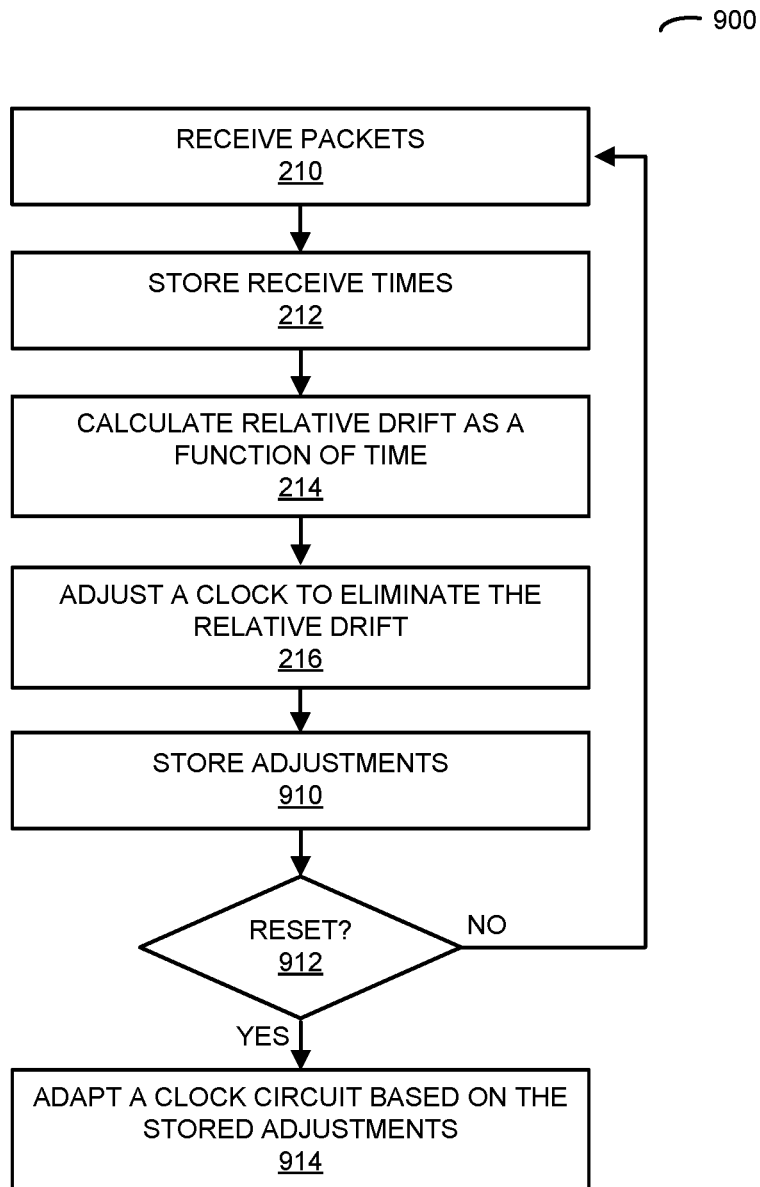
FIG. 9 is a flow diagram illustrating an example of a method for reducing drift in accordance with an embodiment of the present disclosure.

In some embodiments, the coordination technique is robust even when a wireless reset occurs, such as when communication performance degrades (e.g., due to interference) and either or both interface circuits on opposite sides of a link are reset to a default state or default link parameters (including resetting counters associated with interface clock circuits in or associated with the interface circuits). This is shown in FIG. 9, which presents a flow diagram illustrating an example of a method 900 for reducing drift. Method 900 may be performed by an interface circuit in an electronic device (which may be a slave) such as one of A/V display devices 114 (FIG. 1) or one of speakers 118 (FIG. 1).

During operation, the interface circuit may receive, via wireless communication, packets (operation 210) from a second electronic device (which may be a master), where a given packet includes a transmit time, based on a second clock in the second electronic device when the second electronic device transmitted the given packet.

In response to receiving the packet(s), the interface circuit may store receive times (operation 212) when the packets were received, where the receive times are based on a clock in the electronic device.

Then, the interface circuit may calculate, based on differences between the transmit times and the receive times, relative drift as a function of time (operation 214) between the clock and the second clock, and may adjust, based on the relative drift, a clock circuit (such as an interface clock circuit in or associated with the interface circuit) that provides the clock to eliminate the relative drift (operation 216).

Moreover, the interface circuit may store the adjustments (operation 910) to the clock circuit.

Furthermore, when the interface circuit or a second interface circuit in the second electronic device is reset (operation 912), the interface circuit may adapt the clock circuit based on the stored adjustments (operation 914) to reduce the relative drift while the interface circuit restores frequency lock with the second clock based on additional packets with additional transmit times that are received from the second electronic device.

Figure 10:
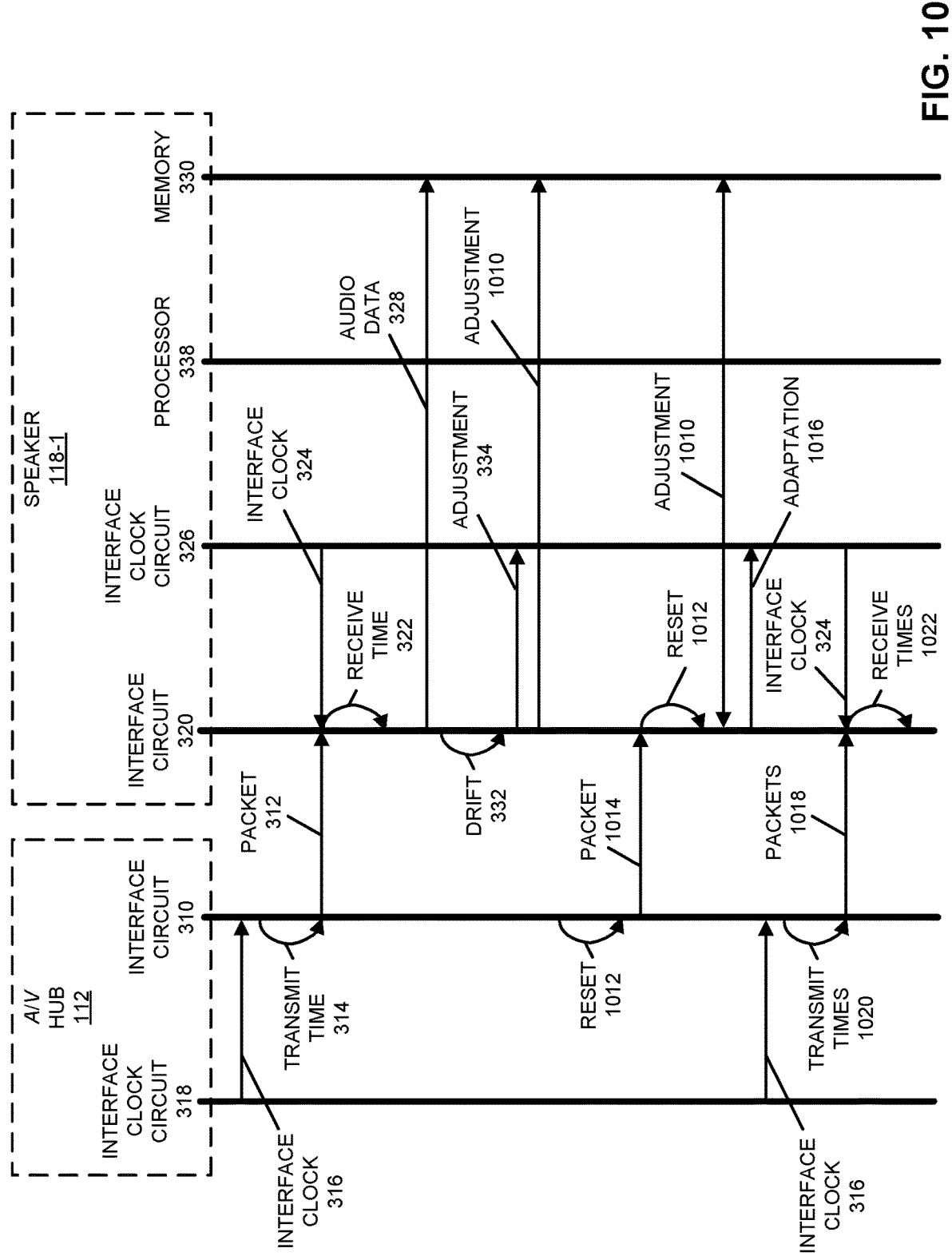
FIG. 10 is a drawing illustrating an example of communication among the electronic devices in FIG. 1 in accordance with an embodiment of the present disclosure.

FIG. 10 presents a drawing illustrating an example of communication among A/V hub 112 and speaker 118-1. In particular, interface circuit 310 in A/V hub 112 may transmit packets (such as packet 312) to speaker 118-1. Each packet may include a corresponding transmit time 314, based on interface clock 316 provided by interface clock circuit 318 in or associated with interface circuit 310 in A/V hub 112, when A/V hub 112 transmitted packet 312. When interface circuit 320 in speaker 118-1 receives packet 312, it may include receive time 322 in packet 312 (or it may store receive time 322 in memory 330), where for each packet the corresponding receive time may be based on interface clock 324 provided by interface clock circuit 326 in or associated with interface circuit 320.

Then, interface circuit 318 may calculate, based on differences between the transmit times and the receive times, relative drift 332 as a function of time between interface clock 316 and interface clock 324, and may adjust 334, based on relative drift 332, interface clock circuit 320 to eliminate relative drift 332. Moreover, interface circuit 318 may store adjustments 1010 to interface clock circuit 326 in memory 330.

Furthermore, when interface circuit 310 and/or interface circuit 318 is reset 1012 (which may be communicated by interface circuit 310 via packet 1014), interface circuit 318 may adapt 1016 interface clock circuit 320 based on the stored adjustments 1010 to reduce relative drift 334 while interface circuit 320 restores frequency lock with interface clock 316 based on additional packets 1018 with transmit times 1020 that are received by interface circuit 320 from interface circuit 310, and corresponding receive times 1022.

In an exemplary embodiment, because of variations in the wireless communication between the A/V hub and the recipient, radios or interface circuits in the A/V hub and/or the recipient are reset routinely and unpredictably. Referring back to FIG. 6, during a wireless reset, CC 614 may receive reset 616 from interface circuit 610. In addition to resetting the counter in interface circuit 610 during the wireless reset, reset 616 may reset a counter in clock circuit 710 (FIG. 7). In this way, electronic device 600 may be internally coordinated, and when the driver in interface circuit 610 resets, and adjustments to clock circuit 710 (FIG. 7) may start being determined and/or applied as soon as the next data packet is received (i.e., when the next transmit time/receive time pair is available). For example, when the driver in interface circuit 610 resets, counters can immediately be incremented or decremented when the next data packet is received.

However, it may take, e.g., 8-16 ms for frequency lock between the A/V hub and the recipient to be restored. During this time interval, the clocks in the A/V hub and the recipient may drift, e.g., by up to 50-60 μs. This relative drift may be perceived by some users as flutter in the audio output by speakers.

Figure 11:
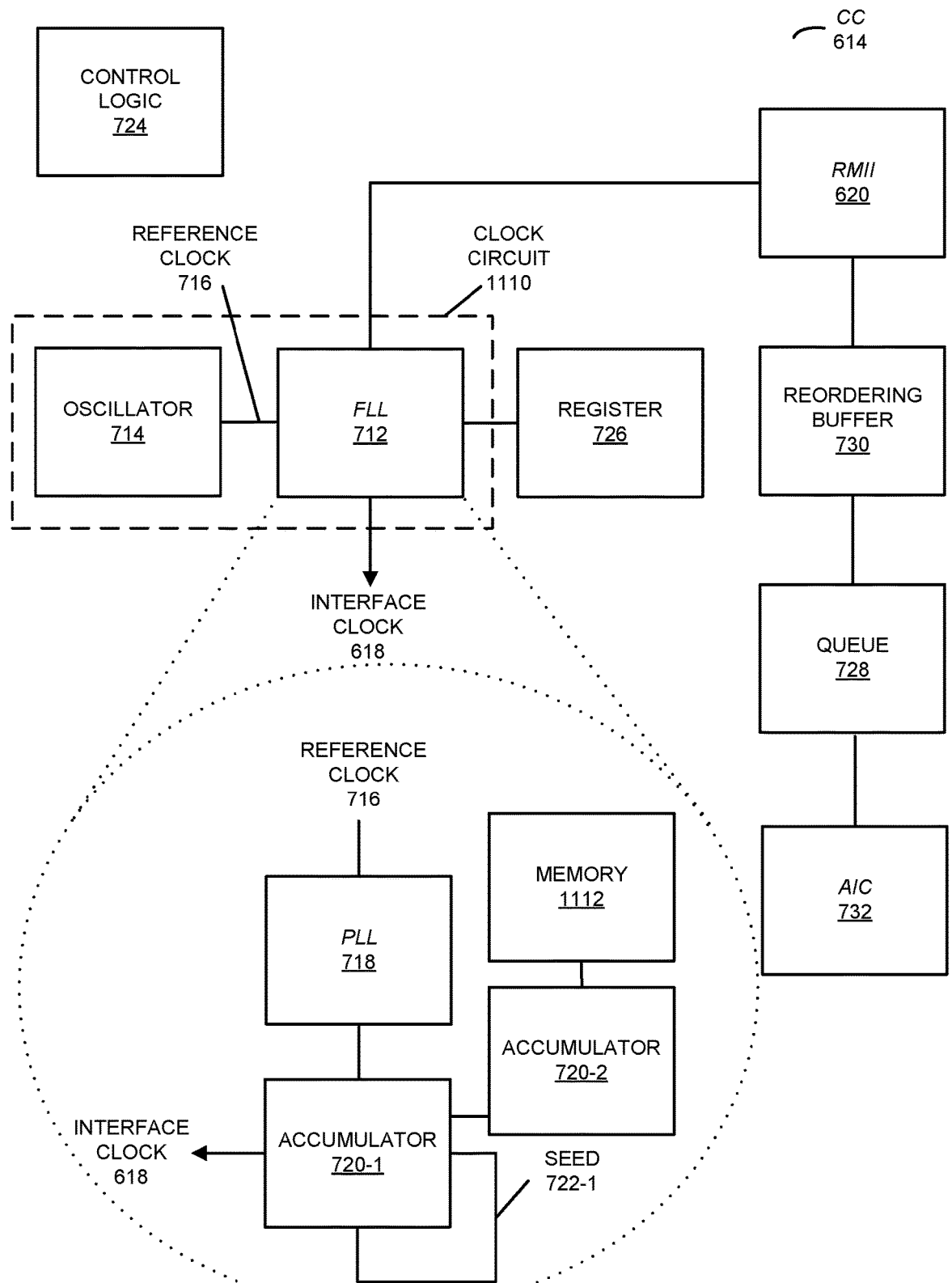
FIG. 11 is a block diagram illustrating an example of a clock circuit in the electronic device in FIG. 6 in accordance with an embodiment of the present disclosure.

In order to address this challenge, the adjustments applied to the clock circuit during the coordination technique may be stored. Then, in the event of a wireless reset, the stored average or mean adjustment during a preceding time interval (such as a preceding 8-16 ms) may be applied to the clock circuit to reduce or eliminate the relative drift when the frequency lock is restored. This is shown in FIG. 11, which presents a block diagram illustrating an example of a clock circuit 1110 in electronic device 600 (FIG. 6). In particular, clock circuit 1100 may include an optional accumulator 720-2 that keeps track of adjustments to accumulator 720-1 during the coordination technique. Moreover, the tracked adjustments may be stored in a register or memory 1112.

Then, when a wireless reset occurs, control logic 724 may use the stored adjustments, or an average or mean adjustment value, to adapt clock circuit 1110 reduce, bound or, ideally, eliminate the relative drift until the frequency lock is restored. For example, the stored adjustments may be averaged over a time scale corresponding to the time interval needed to restore the frequency lock.

Using this approach, the relative drift may be less than 2-8 μs until the frequency lock is restored. In some embodiments, the stored adjustments are averaged over a time interval (such as 16 ms) or low-pass filtered. Alternatively or additionally, the adjustments may be applied to seed 722-1 of accumulator 720-1 with a reduced update frequency or rate in order to provide damping or systematic under-relaxation. Thus, the adapting may be performed on a longer time scale than the adjusting, such as every millisecond and, more generally, with a periodicity that is a fraction of the time interval needed to restore the frequency lock.

Once the frequency lock is restored, the remaining time offset may be determined by control logic 724, so the phase of the playback operation may be coordinated.

Figure 12:
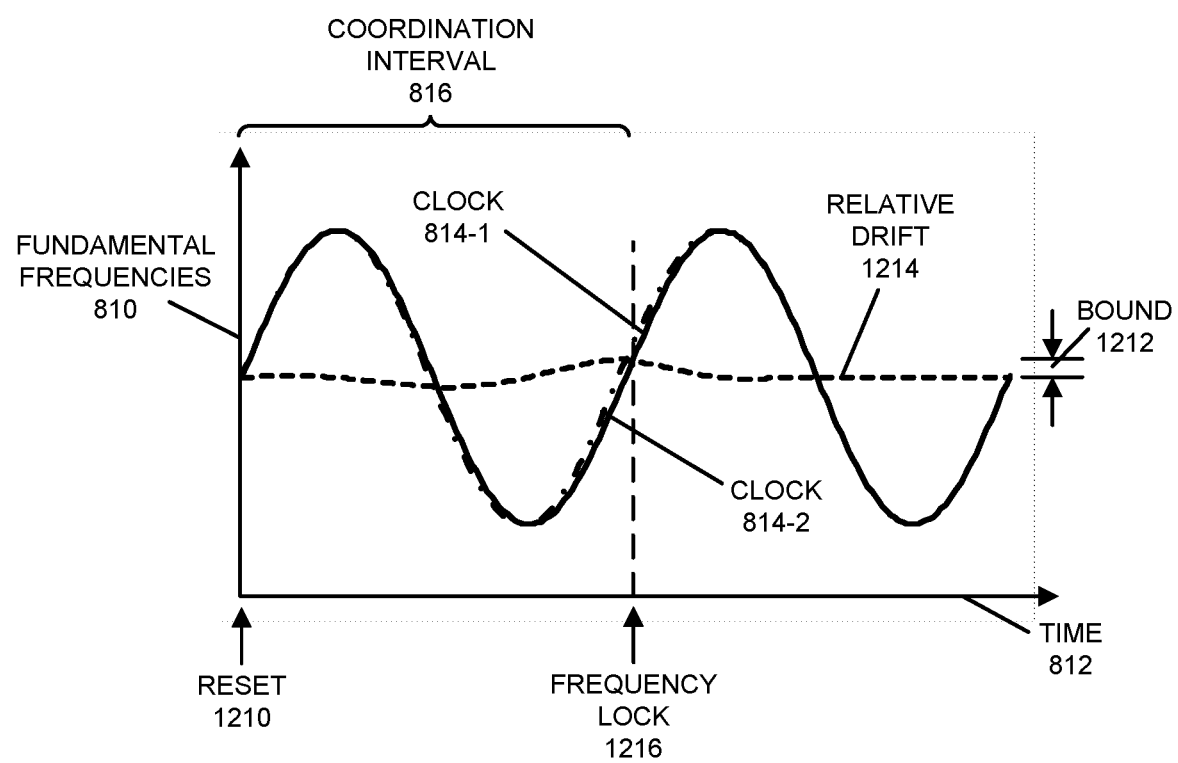
FIG. 12 is a timing diagram illustrating an example of clocks in electronic devices in FIG. 1 as a function of time after a wireless reset in accordance with an embodiment of the present disclosure.

FIG. 12 presents a timing diagram illustrating an example of clocks 1210 in electronic devices in FIG. 1 as a function of time after a wireless reset. In particular, when a reset 1210 occurs, stored adjustments may be applied to bound 1212 relative drift 1214 as a function of time 812 until frequency lock 1216 is restored.

Alternatively or additionally to the aforementioned approach, in some embodiments clock circuit 1100 includes an optional sample-and-hold circuit 1112 that mirrors a current counter value of the counter for interface clock 618 when interface circuit 610 (FIG. 6) and/or the interface circuit in the A/V hub is reset. This counter value may be used to bound the relative drift while the frequency lock is restored.

Coordination of a Playback Operation Using a Processor

Figure 13:
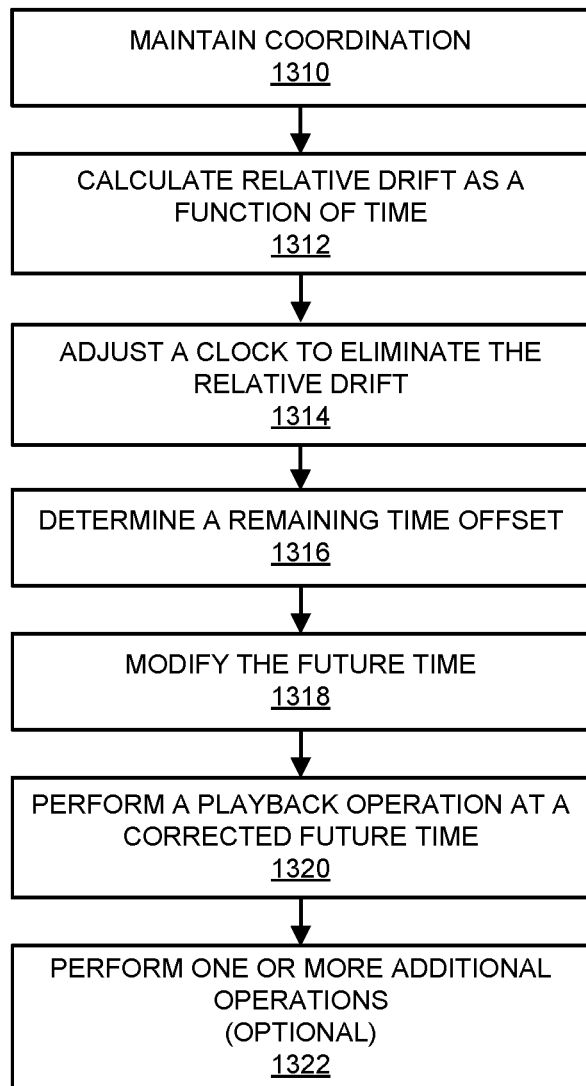
FIG. 13 is a flow diagram illustrating an example of a method for coordinating a playback operation in accordance with an embodiment of the present disclosure.

Instead of performing the coordination technique in hardware (such as an interface circuit), in some embodiments the coordination technique is performed, at least in part, by a processor that executes software. In particular, the coordination technique may involve coordinating the playback operation in different clock domains in the electronic device. This is shown in FIG. 13, which presents a flow diagram illustrating an example of a method 1300 for coordinating a playback operation. Method 1300 may be performed by a processor executing software (such as a program module) in an electronic device (which may be a slave) such as one of A/V display devices 114 (FIG. 1) or one of speakers 118 (FIG. 1). The processor may include a control circuit or control logic. Note that instructions for operations in the software may be stored in memory in the electronic device.

During operation, the processor may maintain coordination (operation 1310) between a system clock provided by a system clock circuit in the electronic device and an interface clock provided by an interface clock circuit in the electronic device (e.g., by adjusting the system clock), where the interface clock has a higher frequency than the system clock.

Then, the processor may calculate, based on differences between receive times when an interface circuit received packets from a second electronic device (which may be a master) via wireless communication and transmit times, included in the packets, when the second electronic device transmitted the packets, relative drift as a function of time (operation 1312) between the interface clock and a second interface clock in the second electronic device, where a given packet includes a transmit time, based on the second interface clock, when the second electronic device transmitted the given packet. Note that the transmit times may correspond to the leading edges or the trailing edges the packets. Similarly, the receive times may correspond to the leading edges or the trailing edges the packets. The adjustments may be based on the differences for successive packets.

Moreover, the processor may adjust, based on the relative drift, the system clock circuit to eliminate the relative drift (operation 1314), where the relative drift, which is based on the interface clock, provides higher resolution than the system clock. For example, while the coordination between the interface clock and the system clock may be highly accurate, an output register that reads a current value of the system clock may not have the same accuracy. Consequently, the interface clock may be used to determine the relative drift and, as described below, to determine the remaining offset. Note that the adjustments may frequency lock the interface circuit and the second interface circuit.

Next, the processor may determine a remaining time offset (operation 1316) between the interface clock and the second interface clock.

Furthermore, the processor may modify, based on the remaining time offset, a future time (operation 1318) when the electronic device is to perform the playback operation, which was received from the second electronic device, to determine a corrected future time.

Additionally, the processor may perform the playback operation at the corrected future time (operation 1320). In particular, the packets may include audio data in payloads, and the electronic device may store the audio data in a queue. In these embodiments, the playback operation may include outputting the audio data from the queue. Note that the adjusting of the system clock (operation 1314) and the modifying of the future time (operation 1318) may coordinate the playback operation in a clock domain of the interface clock to within a predefined value of a clock domain of the second interface clock.

In some embodiments, the processor optionally performs one or more additional operations (operation 1322). For example, prior to performing the playback operation (operation 1320), the processor may: disable interrupts in the electronic device; and occupy at least a portion of a software stack by executing a loop to reduce a latency associated with performing the playback operation.

Moreover, the transmit time and the receive time may be stored on opposite ends of a payload of the given packet. In these embodiments, the processor may determine a duration of the payload and may add the duration to the remaining offset time.

Furthermore, when a reset of the interface circuit or a second interface circuit in the second electronic device occurs, the processor may mirror the interface clock by sampling and holding a counter value in a counter in the interface circuit that corresponds to the interface clock prior to the counter being reset. In these embodiments, the mirrored counter value may allow the interface circuit to reduce the relative drift while the interface circuit restores frequency lock with the second interface clock based on additional packets with the additional transmit times that are received by the interface circuit from the second electronic device.

Figure 14:
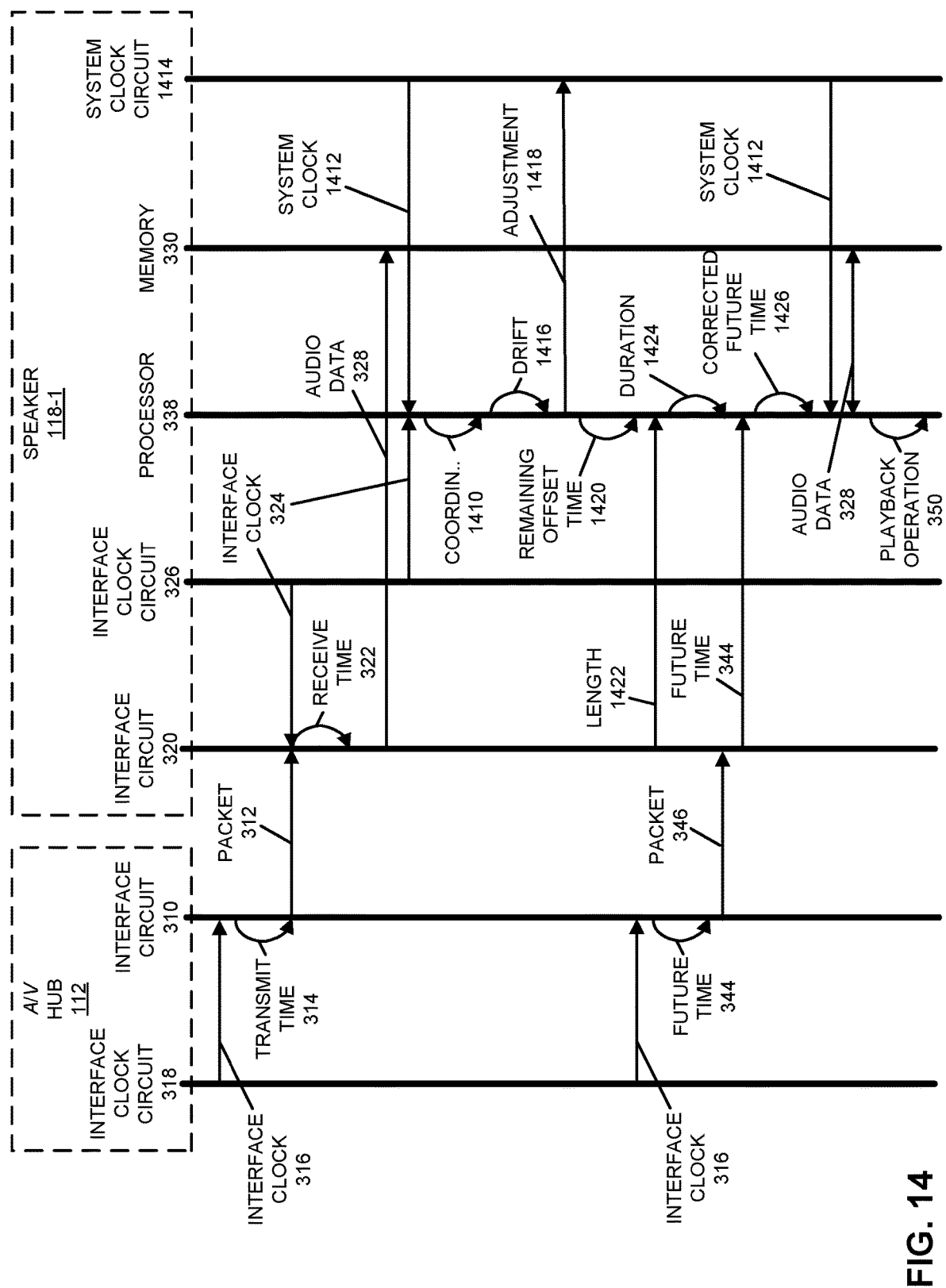
FIG. 14 is a drawing illustrating an example of communication among the electronic devices in FIG. 1 in accordance with an embodiment of the present disclosure.

FIG. 14 presents a drawing illustrating an example of communication among A/V hub 112 and speaker 118-1. In particular, interface circuit 310 in A/V hub 112 may transmit packets (such as packet 312) to speaker 118-1. Each packet may include a corresponding transmit time 314, based on interface clock 316 provided by interface clock circuit 318 in or associated with interface circuit 310 in A/V hub 112, when A/V hub 112 transmitted packet 312. When interface circuit 320 in speaker 118-1 receives packet 312, it may store receive time 322 in memory 330 (or may include receive time 322 in packet 312), where for each packet the corresponding receive time may be based on interface clock 324 provided by interface clock circuit 326 in or associated with interface circuit 320.

Processor 338 may maintain coordination 1410 between a system clock 1412 provided by a system clock circuit 1414 in speaker 118-1 and interface clock 324 (e.g., by adjusting system clock 1412), where interface clock 324 has a higher frequency than system clock 1412.

Then, processor 338 may calculate, based on differences between the receive times and the transmit times, relative drift 1416 as a function of time between interface clock 324 and interface clock 316.

Moreover, processor 338 may adjust 1418, based on relative drift 1416, system clock circuit 1414 to eliminate relative drift 1416, where relative drift 1416, which is based on interface clock 324, provides higher resolution than system clock 1412. Next, processor 338 may determine a remaining time offset 1420 between interface clock 324 and interface clock 316. For example, while the coordination between interface clock 324 and system clock 1412 may be highly accurate, an output register that reads a current value of system clock 1412 may not have the same accuracy. Consequently, interface clock 324 may be used to determine the relative drift and, as described below, to determine the remaining offset.

In some embodiments, the transmit times and the receive times may be stored on opposite ends of payload of the packets. In these embodiments, processor 338 may determine a duration 1424 or time associated with a length 1422 of the payload and processor 338 may add duration 1424 to remaining offset time 1420.

Furthermore, interface circuit 310 may transmit packet 346 that includes information that specifies a future time 344 when speaker 118-1 is to perform a playback operation 350. After interface circuit 320 receives packet 346, processor 338 may modify future time 344 based on remaining time offset 1420 to determine a corrected future time 1426.

Additionally, processor 338 may perform playback operation 350 at corrected future time 1426. In particular, the packets and/or additional packets may include audio data 328 in payloads, and processor 338 may store audio data 328 in a queue in memory 330. In these embodiments, playback operation 350 may include outputting audio data 328 from the queue, including driving an electrical-to-acoustic transducer in speaker 118-1 based on audio data 328 so speaker 118-1 outputs sound. Note that the adjusting 1418 of system clock 1412 and the modifying of future time 344 may coordinate playback operation 350 in a clock domain of interface clock 324 to within a predefined value of a clock domain of interface clock 316.

In some embodiments, prior to performing playback operation 350, processor 338: disables interrupts in speaker 118-1; and occupies at least a portion of a software stack by executing a loop to reduce a latency associated with performing playback operation 350.

Furthermore, when a reset of interface circuit 310 and/or interface circuit 320 occurs, processor 338 may mirror interface clock 324, e.g., by sampling and holding a counter value in a counter in interface circuit 320 that corresponds to interface clock 324 prior to the counter being reset. In these embodiments, the mirrored counter value may allow interface circuit 320 to reduce relative drift 1416 while interface circuit 320 restores frequency lock with interface clock 316 based on additional packets with transmit times that are received by interface circuit 320 from interface circuit 310 (as described previously with reference to FIGS. 9-12).

In an exemplary embodiment, the coordination is performed, at least in part, by software/firmware executed by a processor. In particular, instead of hardware (such as the interface circuit) performing the clock adjustments based the transmit times and the receive times (i.e., in-band time signaling, as opposed to a separate side channel), the software or the firmware may slow down or speed up the I²S clock based on the differences between the transmit times and the receives times (and, more generally, coordination information) to frequency lock the interface clocks in the A/V hub and the recipient. Then, the processor may determine the remaining time offset based on the transmit times and the receive times that are received in data packets.

In order to avoid variable interrupt latency, when the future time is received from the A/V hub along with an instruction to perform the playback operation, the processor in the recipient may: disable interrupts, determine the corrected future time based on the future time and the remaining time offset, and execute a busy loop until the corrected future time. Then, based on the I²S clock, the recipient may perform the playback operation at the corrected future time.

Figure 15:
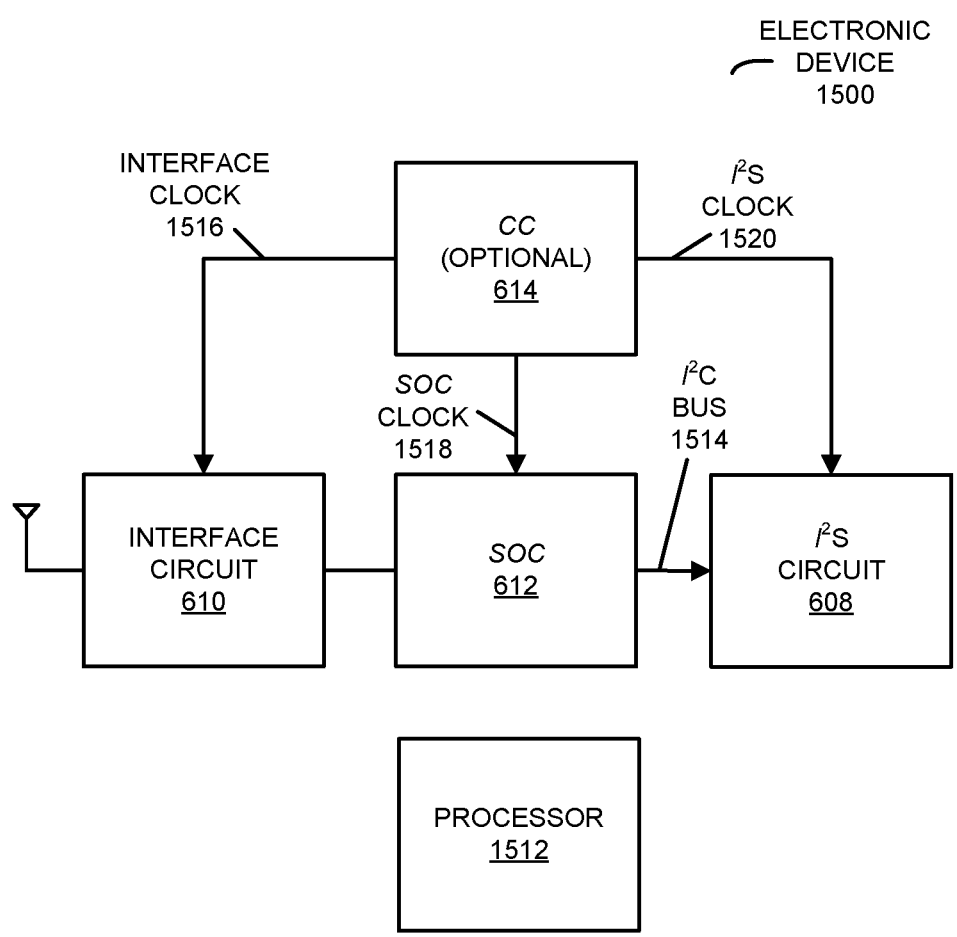
FIG. 15 is a block diagram illustrating an example of an electronic device in FIG. 1 in accordance with an embodiment of the present disclosure.

FIG. 15 presents a block diagram illustrating an example of an electronic device 1500 in FIG. 1. In the discussion that follows, electronic device 1500 may include speaker 118-1 in FIG. 1. However, in other embodiments, the flow of coordination information is reversed and electronic device 1500 includes A/V hub 112 in FIG. 1.

Electronic device 1500 may include: interface circuit 610, SOC 612, CC 614, I²S circuit 608 and processor 1512. I²S circuit 608 may be coupled to SOC 612 by an Inter-Integrated Circuit (PC) bus 1514 that provides control information. In addition, CC 614 (which may be optional in FIG. 15) may generate and provide interface clock 1516, SOC clock 1518 and I²S clock 1520 (which is sometimes referred to as a 'system clock'). Alternatively, provide interface clock 1516, SOC clock 1518 and/or I²S clock 1520 may be provided by or based on an external oscillator, such as a crystal oscillator. In some embodiments, interface clock 1516 has a fundamental frequency of approximately 24.576 MHz and I²S 1520 has a sampling frequency between 44-192 kHz.

In electronic device 1500, the relative drift (based on the transmit times and the receive times from interface circuit 610) may be used by processor 1512 to adjust a clock circuit in CC 614, so interface clock 1516 is frequency locked to a corresponding interface clock in the A/V hub, and to maintain coordination between interface clock 1516 and I²S clock 1520 (e.g., by adjusting I²S clock 1520). Note that interface clock 1516 may have a higher resolution than I²S clock 1520, and thus may improve the accuracy of the coordination in electronic device 1500. For example, while the coordination between interface clock 1516 and I²S clock 1520 may be highly accurate, an output register that reads a current value of I²S clock 1520 may not have the same accuracy. Consequently, interface clock 1516 may be used to perform the adjustments and, as described below, to determine the remaining offset.

Moreover, processor 1512 may determine the remaining offset, and may modify the future time based on the remaining time offset to determine the corrected future time. Then, after disabling interrupts and executing the busy loop, processor 1512 may instruct electronic device 1500 to perform the playback operation at the corrected future time.

In some embodiments, instead of determining the transmit times and/or the receive times using one or more clocks that are generated within electronic device 1500, the transmit times and/or the receive times are based on one or more external clocks that are supplied to electronic device 1500.

Moreover, in the event of a wireless reset, I²S clock 1520 may be lost because the associated counters for interface clock 1516 and/or the relative drift are reset. In order to address this challenge, CC 614 may mirror these counter(s). For example, a sample-and-hold operation may be performed on reset. In particular, CC 614 may include one or more high-resolution counters to mirror the counter(s) for interface circuit 1516 and/or the relative drift. For example, CC 614 may perform a sample and hold of the counter value(s) when reset 616 (FIG. 6) is asserted or toggled.

Figure 16:
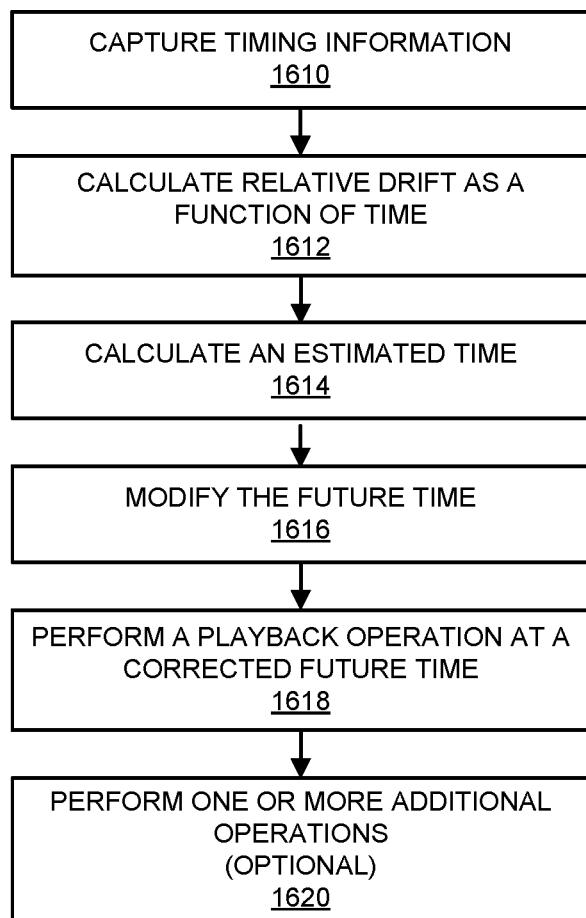
FIG. 16 is a flow diagram illustrating an example of a method for coordinating a playback operation in accordance with an embodiment of the present disclosure.

FIG. 16 presents a flow diagram illustrating an example of a method 1600 for coordinating a playback operation, which may be performed by a processor executing software (such as a program module) in an electronic device (which may be a slave) such as one of A/V display devices 114 (FIG. 1) or one of speakers 118 (FIG. 1). The processor may include a control circuit or control logic. Note that instructions for operations in the software may be stored in memory in the electronic device.

During operation, the processor may capture timing information (operation 1610) associated with an interface clock provided by an interface clock circuit in the electronic device or a reference clock that is used by the interface clock circuit to generate the interface clock to increase a resolution of the system clock, where the interface clock has a higher frequency than the system clock. For example, the capturing of the timing information may involve storing time values of the interface clock in a register or a counter. Alternatively or additionally, the electronic device may include an oscillator that provides the reference clock, and the interface clock circuit may provide the interface clock based on the reference clock. In these embodiments, the timing information is captured from the reference clock.

Then, the processor may track, using the timing information, relative drift as a function of time (operation 1612) between the system clock and the interface clock, where the interface clock is coordinated with a second interface clock in a second electronic device based on time-coordination information received, via wireless communication, in packets from the second electronic device. For example, the timing information may be included in beacons transmitted by the second electronic device. Alternatively or additionally, the timing information may be included in control packets and/or data packets transmitted by the second electronic device.

Moreover, the processor may determine, based on the relative drift, an estimated time offset (operation 1614) between the interface clock and the system clock at a future time, which was received from the second electronic device, when the electronic device is to perform the playback operation.

Next, the processor may modify the future time (operation 1616) based on the estimated time offset to determine a corrected future time.

Furthermore, the processor may perform the playback operation at the corrected future time (operation 1618). In particular, the interface circuit may receive additional packets that include audio data in payloads. Alternatively or additionally, at least some of the audio data may be received in the same packet(s) as the information. In these embodiments, the electronic device stores the audio data in a queue, and the playback operation includes outputting the audio data from the queue. Note that the capturing (operation 1610), tracking (operation 1612), determining (operation 1614) and modifying (operation 1616) may coordinate the playback operation within a predefined value of the clock domain of the second interface clock.

In some embodiments, the processor optionally performs one or more additional operations (operation 1620). For example, prior to performing the playback operation (operation 1618), the processor may: disable interrupts in the electronic device; and occupy at least a portion of a software stack by executing a loop to reduce a latency associated with performing the playback operation.

In some embodiments of methods 200 (FIG. 2), 400 (FIG. 4), 900 (FIG. 9), 1300 (FIG. 13) and/or 1600 (FIG. 16), there are additional or fewer operations. For example, in method 400 (FIG. 4), the second electronic device may resample the audio data to facilitate the coordination of the playback operation. Moreover, the order of the operations may be changed, and/or two or more operations may be combined into a single operation. Furthermore, one or more operations may be modified. For example, operations performed by the second electronic device (such as A/V hub 112 in FIG. 1) may be performed by the electronic device (such as speaker 118-1 in FIG. 1) and/or vice versa. Additionally, instead of modifying the future time based on the remaining time offset, the electronic device may transmit the remaining time offset to the second electronic device, and the second electronic device may correct the future time for the remaining time offset (such as by subtracting the remaining time offset from the future time) prior to transmitting the modified future time to the second electronic device. Thus, in some embodiments, the second electronic device may pre-compensate the future time for the remaining time offset.

In some embodiments of methods 200 (FIG. 2), 400 (FIG. 4), 900 (FIG. 9), 1300 (FIG. 13) and/or 1600 (FIG. 16), the coordination includes synchronization in the time domain within a temporal or phase accuracy and/or the frequency domain within a frequency accuracy.

Figure 17:
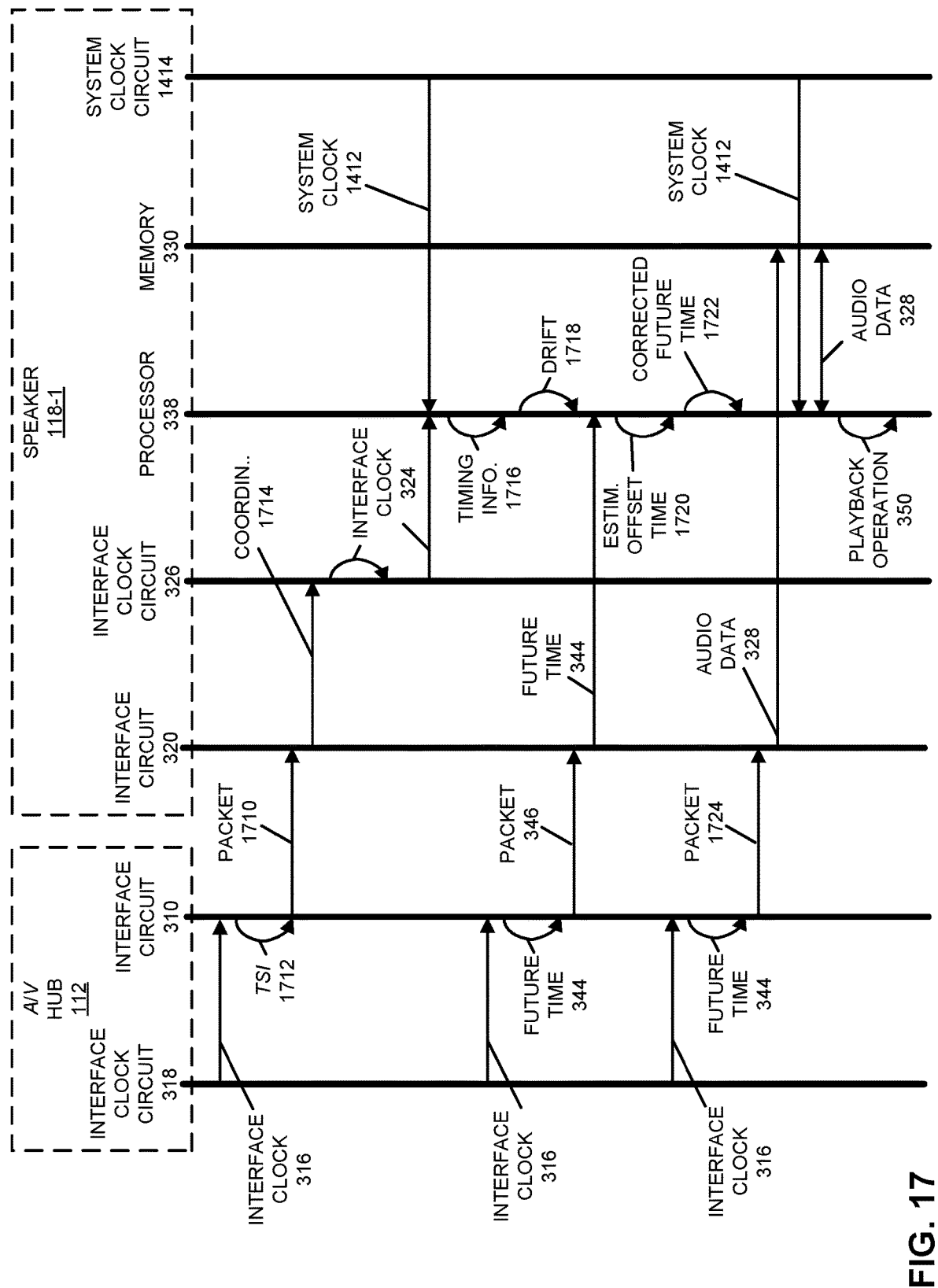
FIG. 17 is a drawing illustrating an example of communication among the electronic devices in FIG. 1 in accordance with an embodiment of the present disclosure.

FIG. 17 presents a drawing illustrating an example of communication among A/V hub 112 and speaker 118-1. In particular, interface circuit 310 in A/V hub 112 may transmit packets 1710 to speaker 118-1. Each packet may include time-coordination information 1712 based on interface clock 316 provided by interface clock circuit 318 in or associated with interface circuit 310 in A/V hub 112. For example, packets 1710 may include beacons and time-coordination information (TSI) 1712 may include a Timing Synchronization Function.

After interface 320 receives packets 1710, interface circuit 320 may coordinate 1714 interface clock 324 provided by interface clock circuit 326 in or associated with interface circuit 320 based on time-coordination information 1712. This coordination may include frequency locking interface clock 324 to interface clock 316, or tracking the relative drift between interface clock 324 to interface clock 316 without the frequency locking.

Processor 338 may capture timing information 1716 associated with interface clock 324 provided by interface clock circuit 326 or a reference clock that is used by the interface clock circuit 326 to generate interface clock 324 to increase a resolution of system clock 1412 provided by system clock circuit 1414, wherein interface clock 324 has a higher frequency than system clock 1412.

Then, processor 1410 may track, using timing information 1716, relative drift 1718 as a function of time between system clock 1412 and interface clock 324.

Moreover, interface circuit 310 may transmit packet 346 that includes information that specifies a future time 344 when speaker 118-1 is to perform a playback operation 350. After interface circuit 320 receives packet 346, processor 338 may determine, based on relative drift 1718, an estimated time offset 1720 between interface clock 324 and system clock 1412 at future time 344. Next, processor 338 may modify future time 344 based on estimated time offset 1720 to determine a corrected future time 1722.

Furthermore, processor 338 may perform playback operation 350 at corrected future time 1722. In particular, interface circuit 310 may transmit packets 1724 that may include audio data 328 in payloads, and processor 338 may store audio data 328 in a queue in memory 330. In these embodiments, playback operation 350 may include outputting audio data 328 from the queue, including driving an electrical-to-acoustic transducer in speaker 118-1 based on audio data 328 so speaker 118-1 outputs sound. Note that the capturing, tracking, determining and modifying may coordinate playback operation 350 within a predefined value of the clock domain of interface clock 316.

In some embodiments, prior to performing playback operation 350, processor 338: disables interrupts in speaker 118-1; and occupies at least a portion of a software stack by executing a loop to reduce a latency associated with performing playback operation 350.

Referring back to FIG. 15, the sample counter granularity for a 192 kHz sampling rate based on I²S clock 1520 is 5.2 µs. Consequently, software cannot detect if I²S clock 1520 drifts until it drifts by at least one sample, which means that the coordination error for the playback operation is already 5.2 µs. Moreover, the coordination error will only be worse for lower sample rates. Therefore, even though the hardware in an electronic device may have a high accuracy, a software-controllable PLL typically cannot determine drift beyond the capabilities defined by I²S clock 1520.

Furthermore, ideally I²S clock 1520 in different electronic devices would start at the same time. However, even if there was a global clock domain done across the electronic devices, they would still need to be coordinated to start at the same time. Alternatively, because there usually is not a way to tell the I²S hardware to start at counter value +X (such as the corrected future time), playback is typically specified by a bit in a start register that starts the playback.

In principle, in order to address these challenges, in the coordination technique an electronic device may perform a loop with interrupts disabled while reading, e.g., a system time counter until it reaches the start time. Then, the electronic can write to the start register to start the playback. However, because the I²S hardware typically does not respond instantaneously, the write to the start register may take longer than 1 µs.

Therefore, in the coordination technique, various components in the electronic device may be coordinated (e.g., the I²S circuit may be in a slower clock domain, it may be buffered by internal first-in first-out buffers, and/or the processor may have internal pipelines that need to be flushed before it can execute the start instruction in a coordinate manner. Furthermore, the I²S hardware behavior may be profiled, and the average or median latency may be added to the corrected future time to correct or offset the I²S hardware latency.

In an exemplary embodiment, interface clock 1516 has a fundamental frequency of approximately 24.576 MHz. Moreover, processor 1512 may use the time-coordination information received from the A/V hub (such as the Timing Synchronization Function in beacons) to coordinate interface clock 1516 with the corresponding interface clock in the A/V hub. For example, interface clock 1516 may have a fixed fundamental frequency (such as 24.576 MHz) and the time-coordination information may be used to keep track of the relative drift.

Because updates/reading of the time-coordination information is expensive (in terms of overhead), SOC clock 1518 may be coordinated to interface clock 1516. In some embodiments, SOC clock 1518 has a fixed fundamental frequency.

SOC clock 1518 may be read to determine additional coordination information. In particular I²S clock 1520 (which is sometimes referred to as a 'system clock') may be coordinated with SOC clock 1518. However, because the sampling frequency of I²S clock 1520 may be between 44-192 kHz, the higher frequency (and higher resolution) SOC clock 1518 may be used to increase the resolution of I²S clock 1520 in the coordination technique.

This software-based coordination technique may allow the entire pipeline to be coordinated (or to allow the relative drift associated with the entire pipeline to be determined), including (as noted previously) the variable processing latency, so the playback operation can be coordinated within the predefined value from the A/V hub to the recipient.

Note that in the event of a wireless reset, all the associated registers in interface circuit 610, SOC 612, and I²S circuit 608 may be reset.

Alternatively or additionally to the preceding approach, in some embodiments a high-resolution counter is included in the clock circuit in CC 614 prior to division by M to generate or produce I²S clock 1520. This may allow direct sampling of I²S clock 1520 to be used to coordinate the playback operation within the predefined value (and, thus, to avoid or reduce jitter). Depending on the clock frequency, this approach may work up to an associated number of channels.

We now describe embodiments of an electronic device. FIG. 18 presents a block diagram illustrating an example of an electronic device 1800, such as portable electronic device 110, A/V hub 112, one of A/V display devices 114, receiver device 116 or one of speakers 118 in FIG. 1. This electronic device includes processing subsystem 1810, memory subsystem 1812, networking subsystem 1814, optional feedback subsystem 1834 and timing subsystem 1836. Processing subsystem 1810 includes one or more devices configured to perform computational operations. For example, processing subsystem 1810 can include one or more microprocessors, application-specific integrated circuits (ASICs), microcontrollers, programmable-logic devices, and/or one or more digital signal processors (DSPs). One or more of these components in processing subsystem are sometimes referred to as a 'control logic' or a 'control circuit.'

Memory subsystem 1812 includes one or more devices for storing data and/or instructions for processing subsystem 1810 and networking subsystem 1814. For example, memory subsystem 1812 can include dynamic random access memory (DRAM), static random access memory (SRAM), and/or other types of memory. In some embodiments, instructions for processing subsystem 1810 in memory subsystem 1812 include: one or more program modules or sets of instructions (such as program module 1822 or operating system 1824), which may be executed by processing subsystem 1810. Note that the one or more computer programs or program modules may constitute a computer-program mechanism. Moreover, instructions in the various modules in memory subsystem 1812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1810.

In addition, memory subsystem 1812 can include circuits or functionality for controlling access to the memory. In some embodiments, memory subsystem 1812 includes a memory hierarchy that comprises one or more caches coupled to a memory in electronic device 1800. In some of these embodiments, one or more of the caches is located in processing subsystem 1810.

In some embodiments, memory subsystem 1812 is coupled to one or more high-capacity mass-storage devices (not shown). For example, memory subsystem 1812 can be coupled to a magnetic or optical drive, a solid-state drive, or another type of mass-storage device. In these embodiments, memory subsystem 1812 can be used by electronic device 1800 as fast-access storage for often-used data, while the mass-storage device is used to store less frequently used data.

Networking subsystem 1814 includes one or more devices configured to couple to and communicate on a wired and/or wireless network (i.e., to perform network operations), including: control logic 1816, interface circuits 1818 and associated antennas 1820. (While FIG. 18 includes antennas 1820, in some embodiments electronic device 1800 includes one or more nodes, such as nodes 1808, e.g., pads, which can be coupled to antennas 1820. Thus, electronic device 1800 may or may not include antennas 1820.) For example, networking subsystem 1814 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 1818 and at least one of antennas 1820 may constitute a radio. In some embodiments, networking subsystem 1814 includes a wired interface, such as HDMI interface 1830.

Networking subsystem 1814 includes processors, controllers, radios/antennas, sockets/plugs, and/or other devices used for coupling to, communicating on, and handling data and events for each supported networking system. Note that components used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1800 may use the components in networking subsystem 1814 for performing simple wireless communication between the electronic devices, e.g., transmitting advertising or beacon frames and/or scanning for advertising frames transmitted by other electronic devices as described previously.

Within electronic device 1800, processing subsystem 1810, memory subsystem 1812, networking subsystem 1814, optional feedback subsystem 1834 and timing subsystem 1836 are coupled together using bus 1828. Bus 1828 may include an electrical, optical, and/or electro-optical connection that the subsystems can use to communicate commands and data among one another. Although only one bus 1828 is shown for clarity, different embodiments can include a different number or configuration of electrical, optical, and/or electro-optical connections among the subsystems.

In some embodiments, electronic device 1800 includes a display subsystem 1826 for displaying information on a display (such as a request to clarify an identified environment), which may include a display driver, an I/O controller and the display. Note that a wide variety of display types may be used in display subsystem 1826, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 1834 may include one or more sensor-feedback components or devices, such as: a vibration device or a vibration actuator (e.g., an eccentric-rotating-mass actuator or a linear-resonant actuator), a light, one or more speakers, etc., which can be used to provide feedback to a user of electronic device 1800 (such as sensory feedback). Alternatively or additionally, optional feedback subsystem 1834 may be used to provide a sensory input to the user. For example, the one or more speakers may output sound, such as audio. Note that the one or more speakers may include an array of transducers that can be modified to adjust a characteristic of the sound output by the one or more speakers. This capability may allow the one or more speakers to modify the sound in an environment to achieve a desired acoustic experience for a user, such as by changing equalization or spectral content, phase and/or a direction of the propagating sound waves.

Additionally, timing subsystem 1836 may include one or more clock circuits 1838 that are used to generate clocks in electronic device 1800, such as based on one or more reference clocks.

Electronic device 1800 can be (or can be included in) any electronic device with at least one network interface. For example, electronic device 1800 can be (or can be included in): a desktop computer, a laptop computer, a subnotebook/netbook, a server, a tablet computer, a smartphone, a cellular telephone, a smartwatch, a consumer-electronic device (such as a television, a set-top box, audio equipment, a speaker, a headset, video equipment, etc.), a remote control, a portable computing device, an access point, a router, a switch, communication equipment, test equipment, and/or another electronic device.

Although specific components are used to describe electronic device 1800, in alternative embodiments, different components and/or subsystems may be present in electronic device 1800. For example, electronic device 1800 may include one or more additional processing subsystems, memory subsystems, networking subsystems, and/or display subsystems. Moreover, while one of antennas 1820 is shown coupled to a given one of interface circuits 1818, there may be multiple antennas coupled to the given one of interface circuits 1818. For example, an instance of a 3×3 radio may include three antennas. Additionally, one or more of the subsystems may not be present in electronic device 1800. Furthermore, in some embodiments, electronic device 1800 may include one or more additional subsystems that are not shown in FIG. 18. Also, although separate subsystems are shown in FIG. 18, in some embodiments, some or all of a given subsystem or component can be integrated into one or more of the other subsystems or component(s) in electronic device 1800. For example, in some embodiments program module 1822 is included in operating system 1824.

Moreover, the circuits and components in electronic device 1800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1814, such as one or more radios. Moreover, the integrated circuit may include hardware and/or software components that are used for transmitting wireless signals from electronic device 1800 and receiving signals at electronic device 1800 from other electronic devices. Aside from the components, circuits and functionality herein described, radios are generally known in the art and hence are not described in detail. In general, networking subsystem 1814 and/or the integrated circuit can include any number of radios.

In some embodiments, networking subsystem 1814 and/or the integrated circuit include a configuration component (such as one or more hardware and/or software components) that configures the radios to transmit and/or receive on a given channel (e.g., a given carrier frequency). For example, in some embodiments, the configuration component can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 1814 may include at least one port (such as an HDMI port 1832) to receive and/or provide the information in the data stream to at least one of A/V display devices 114 (FIG. 1), at least one of speakers 118 (FIG. 1) and/or at least one of content sources 120 (FIG. 1).

While a communication protocol compatible with Wi-Fi was used as an illustrative example, the described embodiments may be used in a variety of network interfaces. For example, in some embodiments the coordination technique is used with an Ethernet communication protocol instead of a wireless communication protocol. In particular, the Ethernet communication protocol may be used for room-to-room communication (i.e., communication over distance larger than 10-30 m). In these embodiments, the Wi-Fi communication protocol may be used for intra-room communication and playback coordination of multiple devices in the room, and the clocks used by the Wi-Fi interface circuit and the Ethernet interface circuit may be coordinated, so that there is end-to-end coordination (i.e., from an I²S circuit in a content source to an I²S circuit in a receiver, such as a speaker). Note that with room-to-room communication via an Ethernet communication protocol, the coordination technique may be compatible with an IEEE 802.11v, such that the transmit time may be provided to the receiver after an ACK is received.

Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the coordination technique may be implemented using program module 1822, operating system 1824 (such as drivers for interface circuits 1818) and/or in firmware in interface circuits 1818. Alternatively or additionally, at least some of the operations in the coordination technique may be implemented in a physical layer, such as hardware in interface circuits 1818.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking at one a display in portable electronic device 110 or on one of A/V display devices 114 in FIG. 1 (e.g., by tracking the user's gaze or where the user is looking).

Furthermore, while A/V hub 112 (FIG. 1) were illustrated as separate components from A/V display devices 114 (FIG. 1), in some embodiments an A/V hub and an A/V display device are combined into a single component or a single electronic device.

While the preceding embodiments illustrated the coordination technique with audio and/or video content (such as HDMI content), in other embodiments the coordination technique is used in the context of an arbitrary type of data or information. For example, the coordination technique may be used with home-automation data. In these embodiments, A/V hub 112 (FIG. 1) may facilitate communication among and control of a wide variety of electronic devices. Thus, A/V hub 112 (FIG. 1) and the coordination technique may be used to facilitate or implement services in the so-called Internet of things.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more antennas;
   a clock circuit that is configured to provide a clock; and
   an interface circuit communicatively coupled to the one or more antennas and the clock circuit, wherein the electronic device is configured to:
   receive, from the one or more antennas, packets associated with a second electronic device, wherein a given packet comprises a transmit time, based on a second clock in the second electronic device, when the second electronic device transmitted the given packet;
   store receive times when the packets were received, wherein the receive times are based on the clock and are determined in a physical layer in the electronic device;

calculate, based on differences between the transmit times and the receive times, relative drift as a function of time between the clock and the second clock, wherein a given difference is between a given transmit time and a given receive time for a given packet;

adjust, based on the relative drift, the clock circuit that provides the clock to eliminate the relative drift;

determine a remaining time offset between the clock and the second clock;

receive, from the one or more antennas, information associated with the second electronic device specifying a future time when the electronic device is to perform a playback operation; and modify the future time based on the remaining time offset to determine a corrected future time; and wherein the electronic device is configured to perform the playback operation at the corrected future time.

2. The electronic device of claim 1, wherein the transmit time is included in the given packet in one of: a payload; and a media access control (MAC) header.

3. The electronic device of claim 1, wherein the clock circuit further comprises:

an oscillator configured to provide a reference clock; and a frequency-locked-loop (FLL) circuit, coupled to the oscillator, configured to generate the clock based on the reference clock; and wherein the electronic device is configured to eliminate the relative drift by modifying the FLL to adjust the clock.

4. The electronic device of claim 3, wherein modifying the FLL comprises changing a seed of a synthesizer in the FLL.

5. The electronic device of claim 1, wherein the transmit time and the receive time are stored on opposite ends of a payload of the given packet; and wherein the electronic device is configured to determine a duration of the payload and the electronic device is configured to add the duration to the remaining offset time.

6. The electronic device of claim 1, wherein the transmit times comprise second counter values corresponding to the second clock and the receive times comprise counter values corresponding to the clock.

7. The electronic device of claim 1, wherein the packets comprise audio data in payloads;

wherein the electronic device is configured to store the audio data in a queue; and wherein the playback operation comprises outputting the audio data from the queue.

8. The electronic device of claim 1, wherein the adjusting the clock and the modifying the future time coordinate the playback operation in a clock domain of the clock to within a predefined value of a clock domain of the second clock.

9. The electronic device of claim 1, wherein the packets comprise control packets.

10. The electronic device of claim 1, wherein the second electronic device is a master and the electronic device is a slave.

11. The electronic device of claim 1, wherein the receive times are associated with a wireless ranging capability of the interface circuit; and wherein the given difference ignores a spatial distance between the electronic device and the second electronic device.

12. A non-transitory computer-readable storage medium for use with an electronic device, the computer-readable storage medium storing program instructions that, when executed by the electronic device, coordinates a playback operation by causing the electronic device to perform one or more operations comprising:

receiving, from one or more antennas in the electronic device, packets associated with a second electronic device, wherein a given packet comprises a transmit time, based on a second clock in the second electronic device, when the second electronic device transmitted the given packet;

storing receive times when the packets were received, wherein the receive times are based on a clock in the electronic device and are determined in a physical layer in the electronic device;

calculating, based on differences between the transmit times and the receive times, relative drift as a function of time between the clock and the second clock, wherein a given difference is between a given transmit time and a given receive time for a given packet;

adjusting, based on the relative drift, a clock circuit that provides the clock to eliminate the relative drift;

determining a remaining time offset between the clock and the second clock;

receiving, from the one or more antennas, information associated with the second electronic device specifying a future time when the electronic device is to perform the playback operation;

modifying the future time based on the remaining time offset to determine a corrected future time; and performing the playback operation at the corrected future time, wherein the adjusting the clock and the modifying the future time coordinate the playback operation in a clock domain of the clock to within a predefined value of a clock domain of the second clock.

13. The non-transitory computer-readable storage medium of claim 12, wherein the transmit time is included in the given packet in one of: a payload; and a media access control (MAC) header.

14. The non-transitory computer-readable storage medium of claim 12, wherein the transmit time and the receive time are stored on opposite ends of a payload of the given packet; and wherein the one or more operations comprise adding a duration of the packet to the remaining offset time.

15. The non-transitory computer-readable storage medium of claim 12, wherein the packets comprise audio data in payloads;

wherein the one or more operations comprise storing the audio data in a queue; and wherein the playback operation comprises outputting the audio data from the queue.

16. A method for coordinating a playback operation, comprising:

by an electronic device:

receiving, from one or more antennas in the electronic device, packets associated with a second electronic device, wherein a given packet comprises a transmit time, based on a second clock in the second electronic device, when the second electronic device transmitted the given packet;

storing receive times when the packets were received, wherein the receive times are based on a clock in the electronic device and are determined in a physical layer in the electronic device;

calculating, based on differences between the transmit times and the receive times, relative drift as a function of time between the clock and the second clock, wherein a given difference is between a given transmit time and a given receive time for a given packet;
adjusting, based on the relative drift, a clock circuit that provides the clock to eliminate the relative drift;
determining a remaining time offset between the clock and the second clock;
receiving, from the one or more antennas, information associated with the second electronic device specifying a future time when the electronic device is to perform the playback operation; and
modifying the future time based on the remaining time offset to determine a corrected future time; and
by the electronic device:
performing the playback operation at the corrected future time, wherein the adjusting the clock and the modifying the future time coordinate the playback operation in a clock domain of the clock to within a predefined value of a clock domain of the second clock.

17. The method of claim 16, wherein the transmit time is included in the given packet in one of: a payload; and a media access control (MAC) header.

18. The method of claim 16, wherein the adjusting comprises modifying a seed of a synthesizer in a frequency-locked loop (FLL) in the clock circuit.

19. The method of claim 16, wherein the transmit time and the receive time are stored on opposite ends of a payload of the given packet; and
wherein the method further comprises adding a duration of the packet to the remaining offset time.

20. The method of claim 16, wherein the packets comprise audio data in payloads;
wherein the method further comprises storing the audio data in a queue; and
wherein the playback operation involves outputting the audio data from the queue.

* * * * *